United States Patent
Nam et al.

(10) Patent No.: US 11,284,409 B2
(45) Date of Patent: Mar. 22, 2022

(54) SUPPORTING MULTIPLE BEAMS IN WIRELESS TRANSMISSIONS

(71) Applicant: QUALCOMM Incorporated, San Diego, CA (US)

(72) Inventors: Wooseok Nam, San Diego, CA (US); Tao Luo, San Diego, CA (US); Vasanthan Raghavan, West Windsor Township, NJ (US); Juergen Cezanne, Ocean Township, NJ (US); Junyi Li, Chester, NJ (US); Muhammad Nazmul Islam, Littleton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/394,959

(22) Filed: Apr. 25, 2019

(65) Prior Publication Data

US 2019/0335477 A1     Oct. 31, 2019

Related U.S. Application Data

(60) Provisional application No. 62/664,776, filed on Apr. 30, 2018.

(51) Int. Cl.
*H04W 72/08* (2009.01)
*H04L 5/00* (2006.01)
*H04W 72/02* (2009.01)
*H04W 72/04* (2009.01)
(Continued)

(52) U.S. Cl.
CPC ......... *H04W 72/085* (2013.01); *H04L 5/0057* (2013.01); *H04W 72/02* (2013.01); *H04W 72/042* (2013.01); *H04W 72/046* (2013.01)

(58) Field of Classification Search
CPC . H04W 72/085; H04W 72/02; H04W 72/046; H04W 72/042; H04L 5/0057;
(Continued)

(56) References Cited

U.S. PATENT DOCUMENTS

2019/0075524 A1* 3/2019 Zhou ................... H04W 52/228
2019/0141693 A1* 5/2019 Guo .................... H04W 72/042
(Continued)

OTHER PUBLICATIONS

Apple Inc: "Discussion on Beam Measurement and Reporting", 3GPP Draft; R1-1804770 Discussion on Beam Measurement and Reporting, 3rd Generation Partnership Project (3GPP), Mobile Competence Centre ; 650, Route Des Lucioles; F-06921 Sophia-Antipolis Cedex; FR, vol. RAN WG1, No. Sanya, China; Apr. 16, 2018-Apr. 20, 2018, Apr. 15, 2018 (Apr. 15, 2018), XP051427037, 8 Pages, Retrieved from the Internet: URL:http://www.3gpp.org/ftp/Meetings%5F3GPP%5FSYNC/RAN1/Docs/ [retrieved on Apr. 15, 2018].

(Continued)

*Primary Examiner* — Harry H Kim
(74) *Attorney, Agent, or Firm* — Michael J. DeHaemer, Jr.

(57) ABSTRACT

Methods, systems, and devices for wireless communications are described that provide for multiple different receive beams at a user equipment (UE) that may be spatially associated with a single transmission beam from a base station. A UE may measure, using multiple different receive beams, multiple instances of a same reference signal transmitted by the base station using a same transmission beam. The UE may provide measurement reports associated with each of the measurements to the base station. A particular receive beam to be used for a downlink transmission may be selected from the multiple receive beams and may be indicated to the UE.

16 Claims, 26 Drawing Sheets

(51) Int. Cl.
*H04B 7/08* (2006.01)
*H04B 7/06* (2006.01)

(58) Field of Classification Search
CPC ..... H04L 5/0053; H04L 5/005; H04L 5/0048; H04B 7/088; H04B 7/0695; H04B 7/0632; H04B 7/0639; H04B 7/0626
See application file for complete search history.

(56) References Cited

U.S. PATENT DOCUMENTS

| | | | | |
|---|---|---|---|---|
| 2019/0150019 A1* | 5/2019 | Saito | ................. | H04W 16/28 370/252 |
| 2020/0127799 A1* | 4/2020 | Orsino | ................. | H04L 5/0053 |
| 2020/0212977 A1* | 7/2020 | Bengtsson | ........... | H04B 7/0695 |
| 2020/0287683 A1* | 9/2020 | Kwak | ................. | H04B 7/0626 |

OTHER PUBLICATIONS

Huawei et al., "Beam Measurement, Reporting and Indication", 3GPP Draft; 3GPP TSG RAN WG1 Meeting #91, R1-1719422, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 27, 2017-Dec. 1, 2017, Nov. 17, 2017 (Nov. 17, 2017), XP051369125, 11 Pages, Retrieved from the Internet: URL:http://www.3gpp.org/ftp/tsg% 5Fran/WG1%5FRL1/TSGR1%5F91/Docs/ [retrieved on Nov. 17, 2017] Sections 2 and 3.1, p. 1-p. 3.
Partial International Search Report—PCT/US2019/029389—ISA/ EPO—dated Jul. 8, 2019.
SONY: "Remaining Issues on Downlink Beam Management", 3GPP Draft; R1-1804593, 3rd Generation Partnership Project (3GPP), Mobile Competence Centre ; 650, Route Des Lucioles ; F-06921 Sophia-Antipolis Cedex ; France, vol. RAN WG1, No. Sanya, China; Apr. 16, 2018-Apr. 20, 2918, Apr. 15, 2018 (Apr. 15, 2018), XP051426862, 5 Pages, Retrieved from the Internet: URL:http:// www.3gpp.org/ftp/Meetings%5F3GPP%5FSYNC/RAN1/Docs/ [retrieved on Apr. 15, 2018].
International Search Report and Written Opinion—PCT/US2019/ 029389—ISA/EPO—dated Sep. 2, 2019.

* cited by examiner

SUPPORTING MULTIPLE BEAMS IN WIRELESS TRANSMISSIONS

CROSS REFERENCES

The present application for patent claims the benefit of U.S. Provisional Patent Application No. 62/664,776 by NAM, et al., entitled "Supporting Multiple Beams In Wireless Transmissions," filed Apr. 30, 2018, assigned to the assignee hereof, and expressly incorporated herein.

BACKGROUND

The following relates generally to wireless communications, and more specifically to supporting multiple beams in wireless transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some deployments, wireless communications systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

In some cases, a device may select a beam direction for communicating with a network by selecting the strongest beam from among a number of reference signals (RSs) transmitted by a base station. For example, the base station may transmit RSs using various beams (e.g., beamformed signals). The UE may monitor these RSs and as part of a beam selection and refinement process establish an active beam pair link (BPL) in which the base station may use a particular transmit beam and the UE may use a particular receive beam for communications. Enhanced flexibility in the establishment and selection of a transmission beam or receive beam may be desirable to increase system efficiency.

SUMMARY

The described techniques relate to improved methods, systems, devices, and apparatuses that support multiple beams in wireless transmissions. Various described techniques provide for multiple different receive beams at a user equipment (UE) that may be spatially associated with a single transmission beam from a base station. In some cases, a UE may measure, using multiple different receive beams, multiple instances of a same reference signal transmitted by the base station using a same transmission beam. The UE may provide measurement reports associated with each of the measurements to the base station. A particular receive beam to be used for a downlink transmission may be selected from the multiple receive beams and may be indicated to the UE (e.g., via downlink control information (DCI)).

The multiple different receive beams may use different beamforming parameters that correspond to different operation modes at the UE, such as operation modes for different RF configurations or different power settings at the UE, for example. In some cases, multiple different transmit beams for transmitting uplink transmissions from the UE to the base station may be spatially associated with a single uplink receive beam for receiving the uplink transmissions at the base station.

A method of wireless communication at a UE is described. The method may include receiving two or more instances of a first reference signal transmitted via a first transmit beam from a base station, measuring at least a first instance of the first reference signal using a first set of receive beamforming parameters to generate a first measurement report, measuring at least a second instance of the first reference signal using a second set of receive beamforming parameters to generate a second measurement report, and transmitting the first measurement report and the second measurement report to the base station.

An apparatus for wireless communication at a UE is described. The apparatus may include a processor, memory in electronic communication with the processor, and instructions stored in the memory. The instructions may be executable by the processor to cause the apparatus to receive two or more instances of a first reference signal transmitted via a first transmit beam from a base station, measure at least a first instance of the first reference signal using a first set of receive beamforming parameters to generate a first measurement report, measure at least a second instance of the first reference signal using a second set of receive beamforming parameters to generate a second measurement report, and transmit the first measurement report and the second measurement report to the base station.

Another apparatus for wireless communication at a UE is described. The apparatus may include means for receiving two or more instances of a first reference signal transmitted via a first transmit beam from a base station, measuring at least a first instance of the first reference signal using a first set of receive beamforming parameters to generate a first measurement report, measuring at least a second instance of the first reference signal using a second set of receive beamforming parameters to generate a second measurement report, and transmitting the first measurement report and the second measurement report to the base station.

A non-transitory computer-readable medium storing code for wireless communication at a UE is described. The code may include instructions executable by a processor to receive two or more instances of a first reference signal transmitted via a first transmit beam from a base station, measure at least a first instance of the first reference signal using a first set of receive beamforming parameters to generate a first measurement report, measure at least a second instance of the first reference signal using a second set of receive beamforming parameters to generate a second measurement report, and transmit the first measurement report and the second measurement report to the base station.

Some examples of the method, apparatuses, and non-transitory computer-readable medium described herein may further include operations, features, means, or instructions for receiving DCI from the base station and determining, based on the DCI, which of the first set of receive beamforming parameters or the second set of receive beamforming parameters may be to be used for receiving a downlink transmission associated with the DCI. Some examples of the method, apparatuses, and non-transitory computer-readable medium described herein may further include operations, features, means, or instructions for transmitting, prior to receiving the two or more instances of the first reference signal, an indication of which of the first set of receive beamforming parameters or the second set of receive beamforming parameters may be preferred for the downlink transmission. In some examples of the method, apparatuses, and non-transitory computer-readable medium described herein, the indication includes an energy indicator (EI), a thermal indicator (TI), a request provided in an uplink transmission, or any combination thereof.

In some examples of the method, apparatuses, and non-transitory computer-readable medium described herein, the receiving the DCI further may include operations, features, means, or instructions for receiving a trigger for an aperiodic channel state indicator (CSI) reference signal (RS), the trigger including a CSI request field that indicates whether the first set of receive beamforming parameters or the second set of receive beamforming parameters may be to be used for measuring the CSI-RS. In some examples of the method, apparatuses, and non-transitory computer-readable medium described herein, the receiving the DCI further may include operations, features, means, or instructions for receiving a transmission configuration indication (TCI) indicator in the DCI that indicates whether the first set of receive beamforming parameters or the second set of receive beamforming parameters may be to be used for the downlink transmission.

In some examples of the method, apparatuses, and non-transitory computer-readable medium described herein, the determining may include operations, features, means, or instructions for identifying one or more parameters associated with the downlink transmission and determining whether the first set of receive beamforming parameters or the second set of receive beamforming parameters may be to be used for the downlink transmission based on the one or more parameters associated with the downlink transmissions. In some examples of the method, apparatuses, and non-transitory computer-readable medium described herein, the one or more parameters associated with the downlink transmission include one or more of a signaled rank indicator (RI) or a signaled modulation and coding scheme (MCS), and where the determining further may include operations, features, means, or instructions for identifying a first RI and a first MCS provided in the first measurement report and a second RI and second MCS provided in the second measurement report, determining that the first set of receive beamforming parameters may be to be used for the downlink transmission based on the signaled RI and signaled MCS matching the first RI and the first MCS or a distance metric corresponding to different RI and MCS values, and determining that the second set of receive beamforming parameters may be to be used for the downlink transmission based on the signaled RI and signaled MCS matching the second RI and the second MCS or the distance metric. In some examples of the method, apparatuses, and non-transitory computer-readable medium described herein, the one or more parameters associated with the downlink transmission include one or more of a signaled RI or a signaled MCS, and where the determining further may include operations, features, means, or instructions for identifying a first RI and a first MCS provided in the first measurement report and a second RI and second MCS provided in the second measurement report and selecting the first set of receive beamforming parameters or the second set of receive beamforming parameters based on which of the first RI and the first MCS or the second RI and the second MCS may be closer to the signaled RI and signaled MCS.

In some examples of the method, apparatuses, and non-transitory computer-readable medium described herein, each of the first measurement report and the second measurement report include one or more of a channel quality indicator (CQI) based on the associated receive beamforming parameters, a precoding matrix indicator (PMI) based on the associated receive beamforming parameters, an RI based on associated receive beamforming parameters, or combinations thereof. In some examples of the method, apparatuses, and non-transitory computer-readable medium described herein, beamforming parameters may include a radio frequency (RF) path, antenna phase parameters for a receive beam pattern, antenna RF frontend gains, a baseband clock mode and or combinations thereof.

Some examples of the method, apparatuses, and non-transitory computer-readable medium described herein may further include operations, features, means, or instructions for receiving configuration information from the base station that configures two or more CSI processes for a first TCI state, where the first TCI state corresponds to a set of transmission beamforming parameters for the first transmit beam and where the first measurement report may be generated responsive to receiving a first CSI process ID and the second measurement report may be generated responsive to receiving a second CSI process ID. In some examples of the method, apparatuses, and non-transitory computer-readable medium described herein, the first CSI process ID may be received via RRC signaling associated with the first instance of the first reference signal and the second CSI process ID may be received via RRC signaling associated with the second instance of the first reference signal.

Some examples of the method, apparatuses, and non-transitory computer-readable medium described herein may further include operations, features, means, or instructions for receiving configuration information from the base station that configures multiplexing of the measuring of the first reference signal using the first set of receive beamforming parameters and the second set of receive beamforming parameters. In some examples of the method, apparatuses, and non-transitory computer-readable medium described herein, the measuring of the first reference signal using the first set of receive beamforming parameters may be performed at even measurement and reporting occasions, and the measuring of the second set of receive beamforming parameters may be performed at odd measurement and reporting occasions. In some examples of the method, apparatuses, and non-transitory computer-readable medium described herein, the measurement and reporting occasions correspond to transmission slots in a radio frame structure.

In some examples of the method, apparatuses, and non-transitory computer-readable medium described herein, the configuration information indicates two or more sets of resources for the two or more instances of the first reference signal within a slot and where the measuring of the first instance of the first reference signal within the slot may be performed using the first set of receive beamforming parameters, and the measuring of the second instance of the first reference signal within the slot may be performed using the second set of receive beamforming parameters. Some examples of the method, apparatuses, and non-transitory computer-readable medium described herein may further include operations, features, means, or instructions for transmitting, prior to receiving the configuration information, an indication of a number of different receive beamforming parameters that can be configured at the UE.

A method of wireless communication at a base station is described. The method may include determining that a UE is capable of using two or more different sets of receive beamforming parameters for receiving downlink transmissions from the base station via a first transmit beam, transmitting two or more instances of a first reference signal to the UE, and receiving two or more measurement reports from the UE corresponding to the two or more different sets of receive beamforming parameters.

An apparatus for wireless communication at a base station is described. The apparatus may include a processor, memory in electronic communication with the processor, and instructions stored in the memory. The instructions may be executable by the processor to cause the apparatus to determine that a UE is capable of using two or more different sets of receive beamforming parameters for receiving downlink transmissions from the base station via a first transmit beam, transmit two or more instances of a first reference signal to the UE, and receive two or more measurement reports from the UE corresponding to the two or more different sets of receive beamforming parameters.

Another apparatus for wireless communication at a base station is described. The apparatus may include means for determining that a UE is capable of using two or more different sets of receive beamforming parameters for receiving downlink transmissions from the base station via a first transmit beam, transmitting two or more instances of a first reference signal to the UE, and receiving two or more measurement reports from the UE corresponding to the two or more different sets of receive beamforming parameters.

A non-transitory computer-readable medium storing code for wireless communication at a base station is described. The code may include instructions executable by a processor to determine that a UE is capable of using two or more different sets of receive beamforming parameters for receiving downlink transmissions from the base station via a first transmit beam, transmit two or more instances of a first reference signal to the UE, and receive two or more measurement reports from the UE corresponding to the two or more different sets of receive beamforming parameters.

In some examples of the method, apparatuses, and non-transitory computer-readable medium described herein, the two or more measurement reports include a first measurement report for a first receive beam at the UE and a second measurement report for a second receive beam at the UE, and where the method further may include operations, features, means, or instructions for selecting which of the first receive beam or the second receive beam may be to be used by the UE for receiving a downlink transmission and transmitting an indication in a DCI transmission that the first receive beam or the second receive beam may be to be used for receiving the downlink transmission.

Some examples of the method, apparatuses, and non-transitory computer-readable medium described herein may further include operations, features, means, or instructions for receiving, prior to the selecting, a beam selection indication from the UE of which of the first receive beam or the second receive beam may be preferred for the downlink transmission. In some examples of the method, apparatuses, and non-transitory computer-readable medium described herein, the beam selection indication includes an EI, a TI, a request provided in an uplink transmission, or any combination thereof.

In some examples of the method, apparatuses, and non-transitory computer-readable medium described herein, the DCI includes a trigger for an aperiodic CSI-RS, the trigger including a CSI request field that indicates which of the two or more different sets of receive beamforming parameters may be to be used for measuring the CSI-RS at the UE. In some examples of the method, apparatuses, and non-transitory computer-readable medium described herein, the DCI includes a TCI that indicates whether the first receive beam or the second receive beam may be to be used by the UE for receiving the downlink transmission. In some examples of the method, apparatuses, and non-transitory computer-readable medium described herein, each of the two or more measurement reports include one or more of a CQI, a PMI, an RI, or combinations thereof, that may be determined based on the two or more different sets of receive beamforming parameters.

Some examples of the method, apparatuses, and non-transitory computer-readable medium described herein may further include operations, features, means, or instructions for configuring the UE with two or more CSI processes for a first TCI state, where the first TCI state corresponds to a set of transmission beamforming parameters for the first transmit beam. Some examples of the method, apparatuses, and non-transitory computer-readable medium described herein may further include operations, features, means, or instructions for configuring the UE to multiplex the measuring of the first reference signal using the two or more different sets of receive beamforming parameters. In some examples of the method, apparatuses, and non-transitory computer-readable medium described herein, the configuring further may include operations, features, means, or instructions for configuring two or more sets of resources for two or more instances of the first reference signal within a slot and configuring the UE to measuring a first instance of the first reference signal within the slot may be using a first set of receive beamforming parameters, and to measure a second instance of the first reference signal within the slot may be using a second set of receive beamforming parameters.

Some examples of the method, apparatuses, and non-transitory computer-readable medium described herein may further include operations, features, means, or instructions for receiving, prior to the configuring, an indication of a number of different receive beams that can be configured at the UE.

A method of wireless communication at a UE is described. The method may include determining that two or more different uplink transmission beams are to be configured for uplink transmissions to a base station, each of the two or more different uplink transmission beams having different transmit beamforming parameters and each of the two or more different uplink transmission beams corresponding to a single set of uplink receive beamforming parameters at the base station, transmitting a first instance of a first reference signal to the base station using a first uplink transmission beam, transmitting a second instance of the first reference signal to the base station using a second uplink transmission beam, and transmitting an indication to the base station that the first uplink transmission beam or the second uplink transmission beam is used for an uplink transmission.

An apparatus for wireless communication at a UE is described. The apparatus may include a processor, memory in electronic communication with the processor, and instructions stored in the memory. The instructions may be executable by the processor to cause the apparatus to determine that two or more different uplink transmission beams are to be configured for uplink transmissions to a base station, each of the two or more different uplink transmission beams having different transmit beamforming parameters and each of the two or more different uplink transmission beams corresponding to a single set of uplink receive beamforming parameters at the base station, transmit a first instance of a first reference signal to the base station using a first uplink transmission beam, transmit a second instance of the first reference signal to the base station using a second uplink transmission beam, and transmit an indication to the base station that the first uplink transmission beam or the second uplink transmission beam is used for an uplink transmission.

Another apparatus for wireless communication at a UE is described. The apparatus may include means for determining that two or more different uplink transmission beams are to be configured for uplink transmissions to a base station, each of the two or more different uplink transmission beams having different transmit beamforming parameters and each of the two or more different uplink transmission beams corresponding to a single set of uplink receive beamforming parameters at the base station, transmitting a first instance of a first reference signal to the base station using a first uplink transmission beam, transmitting a second instance of the first reference signal to the base station using a second uplink transmission beam, and transmitting an indication to the base station that the first uplink transmission beam or the second uplink transmission beam is used for an uplink transmission.

A non-transitory computer-readable medium storing code for wireless communication at a UE is described. The code may include instructions executable by a processor to determine that two or more different uplink transmission beams are to be configured for uplink transmissions to a base station, each of the two or more different uplink transmission beams having different transmit beamforming parameters and each of the two or more different uplink transmission beams corresponding to a single set of uplink receive beamforming parameters at the base station, transmit a first instance of a first reference signal to the base station using a first uplink transmission beam, transmit a second instance of the first reference signal to the base station using a second uplink transmission beam, and transmit an indication to the base station that the first uplink transmission beam or the second uplink transmission beam is used for an uplink transmission.

Some examples of the method, apparatuses, and non-transitory computer-readable medium described herein may further include operations, features, means, or instructions for receiving configuration information from the base station that configures two or more SRS resources for two or more instances of a SRS transmission using each of the two or more uplink transmission beams. In some examples of the method, apparatuses, and non-transitory computer-readable medium described herein, the two or more SRS resources include periodic or semi-persistent SRS resources, and the two or more uplink transmission beams may be multiplexed across the two or more SRS resources. In some examples of the method, apparatuses, and non-transitory computer-readable medium described herein, the configuration information configures multiplexing of the two or more uplink transmission beams across the two or more SRS resources. In some examples of the method, apparatuses, and non-transitory computer-readable medium described herein, the configuration information further includes an uplink transmission beam indication field that indicates an uplink transmission beam that may be to be used for the uplink transmission. Some examples of the method, apparatuses, and non-transitory computer-readable medium described herein may further include operations, features, means, or instructions for transmitting, prior to the determining, an indication of a number of different transmission beams that can be configured at the UE.

A method of wireless communication at a base station is described. The method may include determining that two or more different uplink transmission beams are to be configured for uplink transmissions from a UE, each of the two or more different uplink transmission beams having different transmit beamforming parameters and each of the two or more different uplink transmission beams corresponding to a single set of uplink receive beamforming parameters of a first receive beam at the base station, measuring a first instance of a first reference signal from the UE that is transmitted using a first uplink transmission beam to generate a first set of measurements, measuring a second instance of the first reference signal from the UE that is transmitted using a second uplink transmission beam to generate a second set of measurements, and receiving an uplink transmission from the UE via the first receive beam based on the first set of measurements or the second set of measurements.

An apparatus for wireless communication at a base station is described. The apparatus may include a processor, memory in electronic communication with the processor, and instructions stored in the memory. The instructions may be executable by the processor to cause the apparatus to determine that two or more different uplink transmission beams are to be configured for uplink transmissions from a UE, each of the two or more different uplink transmission beams having different transmit beamforming parameters and each of the two or more different uplink transmission beams corresponding to a single set of uplink receive beamforming parameters of a first receive beam at the base station, measure a first instance of a first reference signal from the UE that is transmitted using a first uplink transmission beam to generate a first set of measurements, measure a second instance of the first reference signal from the UE that is transmitted using a second uplink transmission beam to generate a second set of measurements, and receive an uplink transmission from the UE via the first receive beam based on the first set of measurements or the second set of measurements.

Another apparatus for wireless communication at a base station is described. The apparatus may include means for determining that two or more different uplink transmission beams are to be configured for uplink transmissions from a UE, each of the two or more different uplink transmission beams having different transmit beamforming parameters and each of the two or more different uplink transmission beams corresponding to a single set of uplink receive beamforming parameters of a first receive beam at the base station, measuring a first instance of a first reference signal from the UE that is transmitted using a first uplink transmission beam to generate a first set of measurements, measuring a second instance of the first reference signal from the UE that is transmitted using a second uplink transmission beam to generate a second set of measurements, and receiving an uplink transmission from the UE via the first receive beam based on the first set of measurements or the second set of measurements.

A non-transitory computer-readable medium storing code for wireless communication at a base station is described. The code may include instructions executable by a processor to determine that two or more different uplink transmission beams are to be configured for uplink transmissions from a UE, each of the two or more different uplink transmission beams having different transmit beamforming parameters and each of the two or more different uplink transmission beams corresponding to a single set of uplink receive beamforming parameters of a first receive beam at the base station, measure a first instance of a first reference signal from the UE that is transmitted using a first uplink transmission beam to generate a first set of measurements, measure a second instance of the first reference signal from the UE that is transmitted using a second uplink transmission beam to generate a second set of measurements, and receive an uplink transmission from the UE via the first receive beam based on the first set of measurements or the second set of measurements.

Some examples of the method, apparatuses, and non-transitory computer-readable medium described herein may further include operations, features, means, or instructions for transmitting configuration information to the UE that configures two or more SRS resources for two or more instances of a SRS transmission using each of the two or more uplink transmission beams. In some examples of the method, apparatuses, and non-transitory computer-readable medium described herein, the two or more SRS resources include periodic or semi-persistent SRS resources, and the two or more uplink transmission beams may be multiplexed across the two or more SRS resources. Some examples of the method, apparatuses, and non-transitory computer-readable medium described herein may further include operations, features, means, or instructions for receiving, prior to the determining, an indication of a number of different transmission beams that can be configured at the UE.

DETAILED DESCRIPTION

Figure 1:
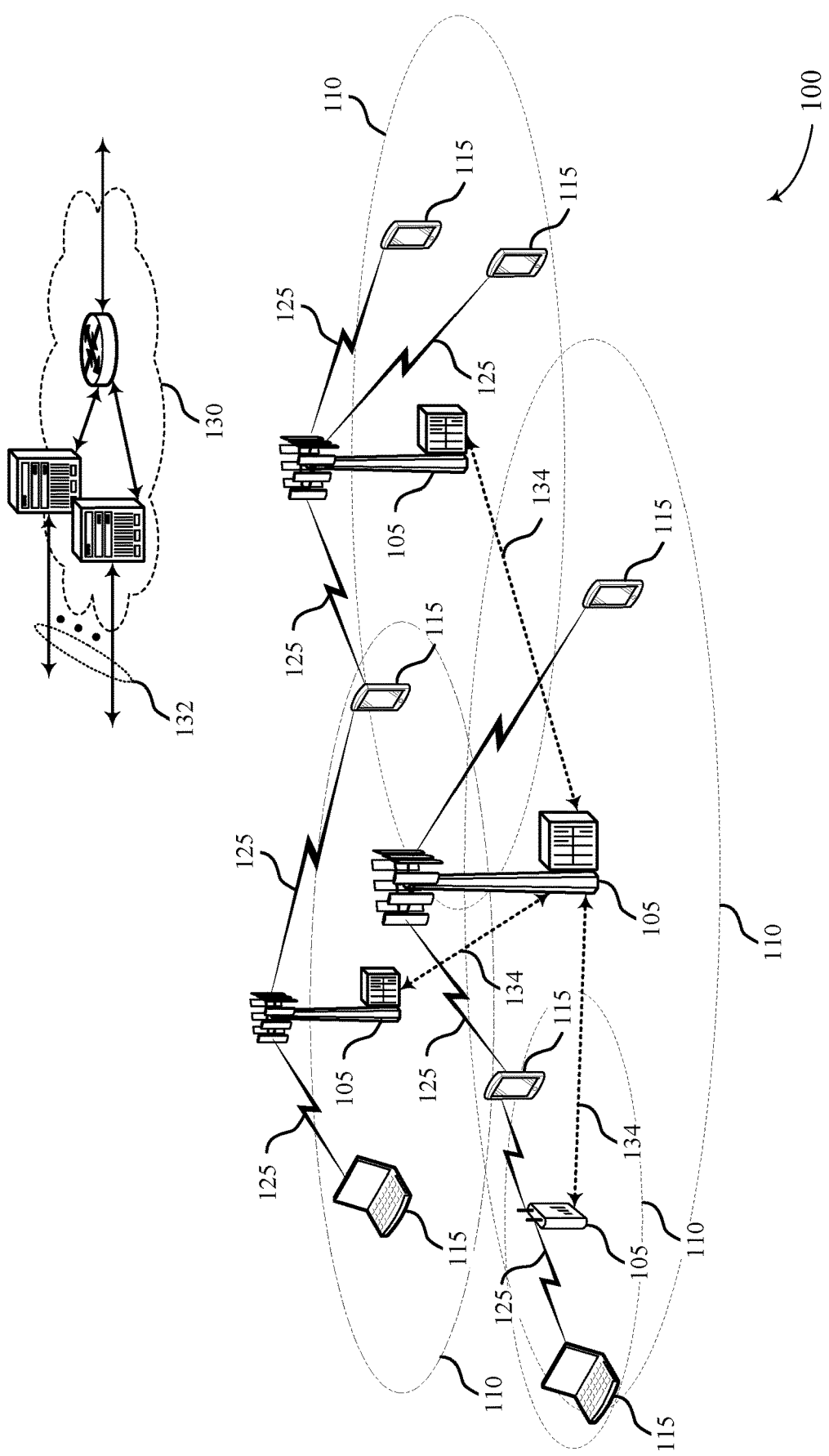
FIG. 1 illustrates an example of a system for wireless communications that supports multiple beams in wireless transmissions in accordance with aspects of the present disclosure.

Various aspects of the present disclosure include techniques for providing multiple different receive beams at a user equipment (UE) that may be spatially associated with a single transmission beam from a base station. In some cases, a UE and base station may select a particular receive beam of the multiple different receive beams based at least in part on one or more conditions at the UE (e.g., radio frequency (RF) configuration, available UE power, thermal conditions at the UE, etc.). Based on the selected receive beam, the base station may transmit the downlink transmission to the UE using, for example, a rank indicator (RI) and modulation and coding scheme (MCS) associated with the selected receive beam. In some cases, the multiple different receive beams may be associated with a single transmission configuration indication (TCI) state.

In some cases, the multiple different receive beams may be established based on reference signal measurements in a beam selection procedure. In such cases, a UE may measure, using multiple different receive beams, multiple instances of a same reference signal transmitted by the base station using a same transmission beam. For example, a base station may transmit a number of instances of a channel state information (CSI) reference signal (RS) using a same transmit beam, with different instances of the CSI-RS measured at the UE using different beamforming parameters of different receive beams. The UE may provide measurement reports associated with each of the measurements to the base station. In some cases, the measurement reports may provide a precoding matrix indicator (PMI), RI and channel quality indicator (CQI) calculated from the particular receive beam. A particular receive beam to be used for a downlink transmission may be selected from the multiple receive beams and may be indicated to the UE (e.g., via downlink control information (DCI)). The UE may use the indicated receive beam for an associated downlink transmission, and demodulate and decode the downlink transmission based on the parameters (e.g., RI and MCS) of the indicated receive beam. In some cases, a particular transmit beam to be used for an uplink transmission may be selected from multiple transmit beamforming parameters, and the transmit beamforming parameters to be used for the transmit beam may be indicated to the UE (e.g., via DCI).

In some cases, multiple different transmit beams for transmitting uplink transmissions from the UE to the base station may be spatially associated with a single uplink receive beam for receiving the uplink transmissions at the base station. In such cases, a UE may transmit multiple instances of a sounding reference signal (SRS) using multiple uplink transmit beams, that may be measured at the base station using a same uplink receive beam. Based on the measurements at the base station, different parameters for uplink transmissions (e.g., MCS) may be calculated. A particular uplink transmit beam to be used for an uplink transmission may be selected from the multiple uplink transmit beams, and may be indicated to the UE (e.g., via DCI). The UE may use the indicated uplink transmit beam for an associated uplink transmission, which may be demodulated and decoded at the base station based on the parameters of the indicated uplink transmit beam.

As indicated above, the multiple different receive and transmit beams may correspond to a single TCI state at the base station. A particular receive or transmit beam may then be selected for a particular transmission based on one or more factors. For example, a UE may be operating in a low power mode, and a receive beam or transmit beam that has a relatively lower power consumption may be selected. In other examples, an energy or thermal indicator at the UE may indicate that lower power is to be used, or that higher power may be selected. In further cases, a particular receive or transmit beam may be selected based on an amount of data to be transmitted, in conjunction with one or more other parameters. Such techniques may allow for flexible selection of receive beams and transmit beams based on conditions, which may help to enhance system reliability, efficiency, and reduce power consumption.

Aspects of the disclosure are initially described in the context of a wireless communications system. Aspects of the disclosure are further illustrated by and described with reference to apparatus diagrams, system diagrams, and flowcharts that relate to supporting multiple beams in wireless transmissions.

FIG. 1 illustrates an example of a wireless communications system 100 that supports multiple beams in wireless transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, UEs 115 and base stations 105 may use beamformed transmission beams in which multiple receive beams or transmit beams at a UE 115 may be mapped to a single transmit or receive beam at a base station 105.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device). According to various aspects of the present disclosure, when a beam direction for a transmit beam from a base station 105 is determined, multiple receive beams at a UE 115 may be mapped to the transmit beam, in which cases the base station 105 may transmit multiple instances of a reference signal using a same transmit beam, that may be measured at the UE 115 using multiple different receive beams.

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

As indicated above, in some cases, multiple different receive beams at a UE 115 may be spatially associated with a single transmission beam from a base station 105. In some cases, a UE 115 may measure, using multiple different receive beams, multiple instances of a same reference signal transmitted by the base station 105 using a same transmission beam. The UE 115 may provide measurement reports associated with each of the measurements to the base station 105. A particular receive beam to be used for a downlink transmission may be selected from the multiple receive beams and may be indicated to the UE 115 (e.g., via downlink control information (DCI)). In some cases, the multiple different receive beams may use different beamforming parameters that correspond to different operation modes at the UE 115 (e.g., operation modes for different RF configurations or different power settings at the UE, etc.). In some cases, multiple different transmit beams for transmitting uplink transmissions from the UE 115 to the base station 100 may be spatially associated with a single uplink receive beam for receiving the uplink transmissions at the base station 105, in a similar manner.

Figure 2:
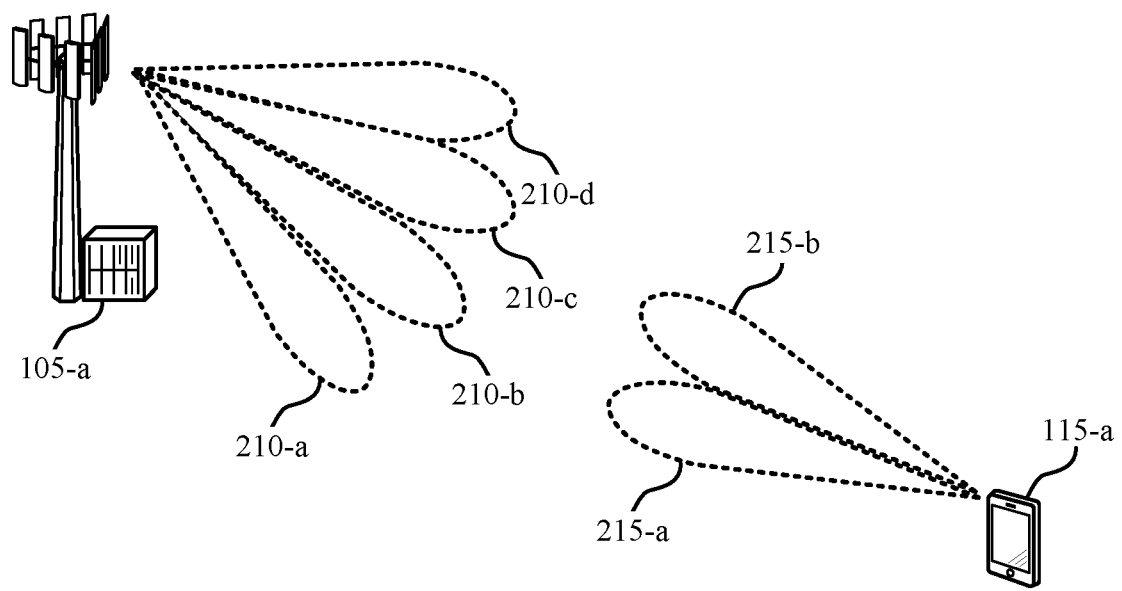
FIG. 2 illustrates an example of a portion of a wireless communications system that supports multiple beams in wireless transmissions in accordance with aspects of the present disclosure.

FIG. 2 illustrates an example of a portion of a wireless communications system 200 that supports multiple beams in wireless transmissions in accordance with aspects of the present disclosure. In some examples, wireless communications system 200 may implement aspects of wireless communications system 100. Wireless communications system 200 may include a base station 105-a and a UE 115-a, which may be examples of the corresponding devices described herein.

In this example, base station 105-a may transmit a plurality of RSs to UEs located with the coverage area of base station 105-a, including UE 115-a. The RSs may be transmitted using RS beams 210. Each RS beam 210 may have an associated beam ID, beam direction, beam symbols, and the like. Examples of the RSs may include synchronization signals (e.g., primary synchronization signal (PSS), secondary synchronization signal (SSS), and the like), channel performance reference signals (e.g., channel state information reference signal (CSI-RS), demodulation reference signals (DMRSs)), broadcast beams (e.g., physical channel broadcast channel (PBCH) beams), beam refinement beams, or any combinations of such RSs.

The UE 115-a may attempt to receive the RSs via receive beams 215, which may be configured using different beamforming parameters at receive circuitry at the UE 115-a. The UE 115-a may identify a particular RS beam 210, such as RS beam 210-c, and a particular receive beam 215, such as 215-b, that provide relatively favorable performance (e.g., that have a best channel quality of the different measured combinations of transmit beams 210 and receive beams 215). In some cases, the UE 115-a may transmit an indication of which RS beam 210 is identified at the UE 115-a as a preferred beam, which the base station 105-a may select for further transmissions to the UE 115-a. The UE 115-a may thus attain and maintain a beam pair link (BPL) with the base station 105-a, which may be further refined and maintained in accordance with one or more established beam management and refinement procedures. Further, in some cases, the UE 115-a may identify one or more BPLs with one or more other base stations that may be used in the event that the BPL with base station 105-a fails (e.g., due to fast fading, blocking, or interference, etc.).

In some cases, each RS beam 210 may be associated with a synchronization signal block (SSB), and the UE 115-b may indicate the preferred RS beam 210 by transmitting uplink transmissions in the resources associated with the SSB of the selected RS beam 210. A particular SSB may have an associated transmission configuration indication (TCI) state. The base station 105-a may, in some cases, indicate a downlink transmission beam based on antenna ports quasi co-location (QCL) information that may be indicated by a TCI state. A TCI state may be associated with one downlink RS set (e.g., a SSB and aperiodic, periodic, or semi-persistent CSI-RS) for different QCL types (e.g., QCL types for different combinations of Doppler shift, Doppler spread, average delay, delay spread, or spatial receive parameters). In cases where the QCL type indicates spatial receive parameters, it may correspond to analog receive beamforming parameters of a receive beam at the UE 115-a. Thus, by the base station 105-a indicating a transmit beam via a TCI indication, the UE 115-a may select a corresponding receive beam from its BPLs.

As indicated above, various aspects of the present disclosure provide that more than one receive beam may be mapped to a same transmit beam that may be indicated via a TCI state. In some cases, the multiple different receive beams may be established based on reference signal measurements using different receive beams. In such cases, the UE 115-a may measure, using multiple different receive beams, multiple instances of a same reference signal transmitted using a same RS transmission beam 210. For example, the base station 105-a may transmit a number of instances of a CSI-RS using a same transmit beam, with different instances of the CSI-RS measured at the UE 115-a using different beamforming parameters of different receive beams. The UE 115-a may provide measurement reports associated with each of the measurements to the base station 105-a. A particular receive beam to be used for a downlink transmission may be selected from the multiple receive beams and may be indicated to the UE 115-a (e.g., via DCI), and the UE 115-a may use the indicated receive beam for an associated downlink transmission, and demodulate and decode the downlink transmission based on the parameters (e.g., RI and MCS) of the indicated receive beam. Examples of multiple receive beam mapping are discussed with respect to FIG. 3. Similar techniques may be used to establish two or more uplink transmit beams from the UE 115-a that are mapped to a single uplink receive beam indicated in a TCI state at the base station 105-a, examples of which are discussed with respect to FIG. 4.

Figure 3:
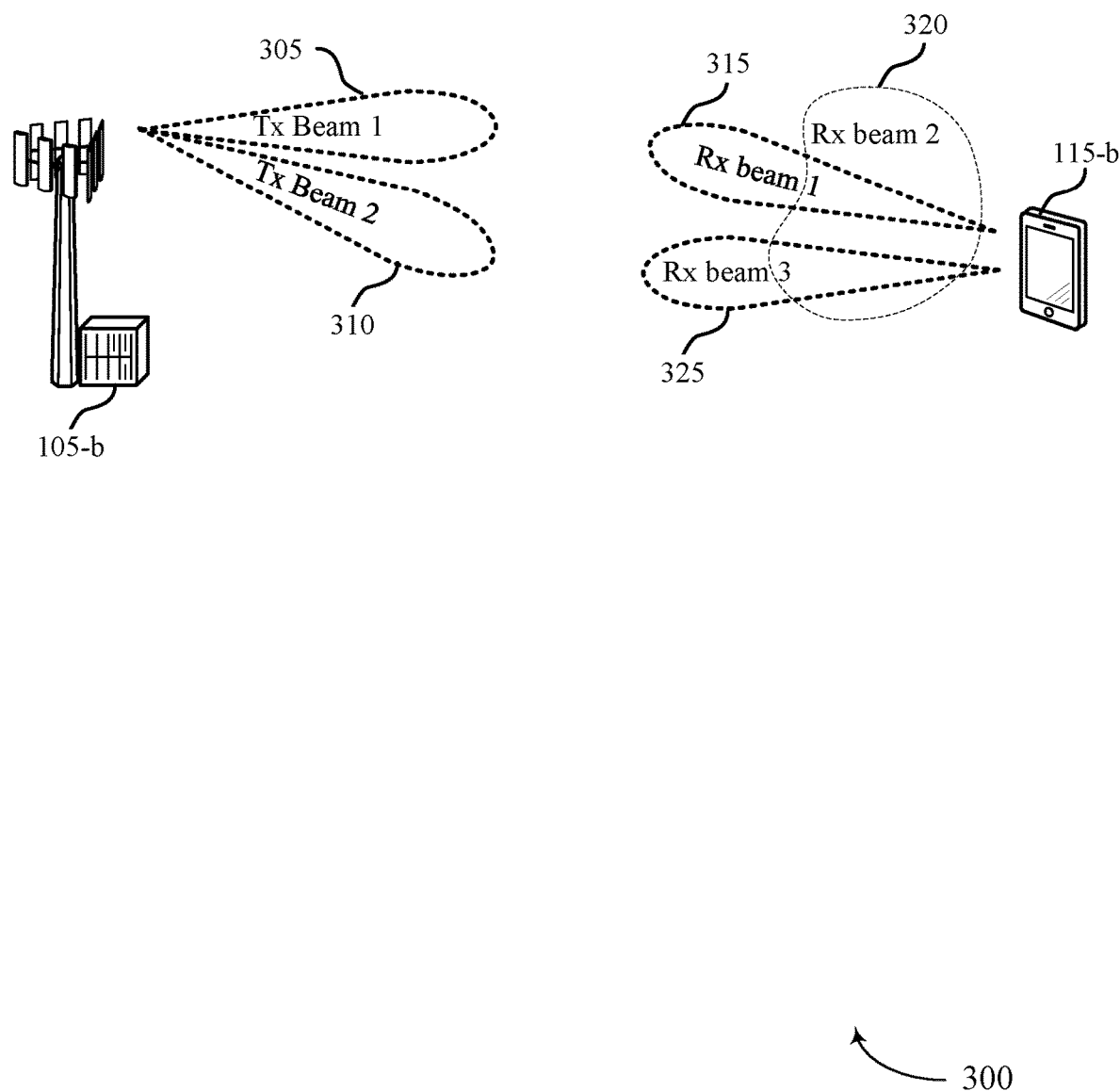
FIG. 3 illustrates an example of transmit beams and receive beams in accordance with aspects of the present disclosure.

FIG. 3 illustrates an example 300 of transmit beams and receive beams in accordance with aspects of the present disclosure. In some examples, transmit beams and receive beams may implement aspects of wireless communications system 100 or 200. In this example, a base station 105-b and a UE 115-b may communicate using beamformed transmissions. As indicated above, in some cases, two or more receive beams may be mapped to a same transmit beam. In the example of FIG. 3, the UE 115-b may have multiple BPLs configured, such that a first BPL maps a first transmission beam 305 to a first receive beam 315, a second BPL maps the first transmission beam 305 to a second receive beam 320, and a third BPL that maps a second transmit beam 310 to a third receive beam 325. Thus, the UE 115-b has two receive beams, namely the first receive beam 315 and the second receive beam 320, that are both mapped to the first transmit beam 305.

In some cases, the multiple receive beams that are mapped to a same transmit beam may be established through measurements of reference signal transmissions using different beamforming parameters of the different receive beams. In the example of FIG. 3, the base station 105-b may transmit multiple instances of a CSI-RS via the first transmit beam 305, and the UE 115-b may measure the different instances using the first receive beam 315 and the second receive beam 320. In some cases, the UE 115-b may be configured with non-zero-power (NZP) CSI-RS resources for CSI measurement and reporting. In this example, for a given transmit beam (e.g., a given TCI state for first transmit beam 305) of a NZP-CSI-RS resource, the UE 115-b may perform CSI measurement and reporting with different receive modes corresponding to the different receive beams (e.g., for the first receive beam 315 and the second receive beam 320). In some examples, for each receive mode a CQI, PMI, RI, or any combination thereof, can be separately calculated and reported to the base station 105-b.

Each of the different receive modes may correspond to different beamforming parameters that provide a different receive beams (e.g., for the first receive beam 315 and the second receive beam 320). In some cases, the different receive modes may correspond to a different number of RF paths (i.e., number of Rx antennas), a different receive beam pattern, (e.g., beam width and/or pattern), different RF (analog) front-end gains (e.g., power amplifier supply voltage/current), different baseband (digital) clock modes (e.g., a high clock mode may be used for high gain and have high processing power and a low clock mode may be used for lower gain and have lower processing power), or any combinations thereof.

When performing measurement and reporting processes for the different receive modes, the UE 115-b may, in some cases, measure multiple instances of a same reference signal transmitted using a same transmit beam by the base station 105-b. For example, the UE 115-b may perform CSI acquisition for the multiple receive modes corresponding to the first receive beam 315 and the second receive beam 320. In some cases, the base station 105-b may configure multiple CSI processes with the same TCI state. In such cases, for each receive mode, corresponding to the first receive beam 315 and second receive beam 320 in the example of FIG. 3, a separate CSI process may be configured, and the CSI-RS resource sets associated with the CSI processes have the same TCI state (e.g., corresponding to the first transmit beam 305). In such cases, each receive mode may be identified by the CSI process ID, which may be provided by radio resource control (RRC) signaling (e.g., provided via RRC parameter CSI-ReportConfigId). For each CSI process, the UE 115-b may measure and report CSI using the corresponding receive mode. Thus, in the example of FIG. 3 a first CSI process may be configured for the first receive beam 315, and a second CSI process may be configured for the second receive beam 320, with the CSI-RS for both the first CSI process and the second CSI process transmitted via the first transmit beam 305.

In other cases, a single CSI process may allow measurement and reporting with multiple receive modes. In such cases, measurement and reporting for different receive modes may be time division multiplexed across multiple instances of CSI-RS transmissions. For example, in a periodic CSI process, the UE 115-b may use a first receive mode, corresponding to the first receive beam 315, at even measurement and reporting occasions (e.g., in even slots). The UE 115-b may then use a second receive mode, corresponding to the second receive beam 315, at odd measurement and reporting occasions (e.g., in odd slots). In another example, CSI-RS resources may be configured with repetition within a slot, so that the UE 115-b may switch receive modes and perform multiple measurements in the same slot. The UE 115-b may report the CSI measurements, and such reporting may be multiplexed in physical uplink control channel (PUCCH) or physical uplink shared channel (PUSCH) within a single reporting occasion. In some cases, the UE 115-b may notify the base station 105-b of its capability for configuring multiple receive modes for a same downlink transmission beam. In some cases, such capability may be indicated in a UE capability indication or UE category that is provided to the base station 105-b. In other cases, such capability may be indicated to the base station 105-b via RRC signaling.

After the base station 105-b receives the multiple measurement reports for the different receive modes, one or more downlink transmissions may be scheduled for the UE 115-b. In some cases, the base station 105-b may select which receive mode the UE 115-b should use for receiving the downlink transmission(s). In some cases, the base station 105-b may explicitly indicate the receive mode, and thus corresponding receive beam, that the UE 115-b should use. In other cases, the receive mode may be implicitly indicated to the UE 115-b. Further, in some cases the receive mode of the UE 115-b may be autonomously decided by the base station 105-b. In other cases, the UE 115-b may provide information to the base station 105-b that requests or facilitates the base station 105-b selection of the UE 115-b receive mode. For example, the UE 115-b may provide an energy indicator (EI) or thermal indicator (TI) to the base station 105-b. The EI may indicate, for example, an amount of remaining energy for the UE 115-b which may indicate that relatively higher energy or relatively lower energy receive beams may be appropriate for the UE 115-b. The TI may indicate, for example, a temperature of the UE 115-b which may indicate that higher processing power (and thus higher heat generation) or lower processing power (and thus lower heat generation) may be appropriate for the UE 115-b. In other cases, the UE 115-b may provide an indication of a preferred receive mode, such as via a PUCCH transmission, a scheduling request transmitted via a physical random access channel (PRACH), a medium access control (MAC) control element (CE), or RRC signaling, to name but a few examples.

The base station 105-b may indicate a receive mode to the UE 115-b, in some cases, which may indicate which of the first receive beam 315 or the second receive beam 320 is to be used for receiving a downlink transmission transmitted via the first transmission beam 305. In some cases, the base station 105-b may facilitate measurement and reporting for different receive beams through CSI reporting, and in some cases may indicate a receive beam through triggering of an aperiodic CSI-RS process. In some cases, a CSI request field (e.g., in DCI format 0_1) may trigger an aperiodic CSI-RS resource with a TCI state. This CSI request field in some examples may be expanded to indicate a receive mode, or a new bit field may be added to indicate a receive mode for the CSI-RS process. In cases where downlink data is scheduled, the base station 105-b may, in some examples, provide scheduling information (e.g., a resource allocation) for the downlink data with a receive mode indication that indicates a receive beam and associated receive beamforming parameters that are to be used for receiving the downlink data. In some cases, a TCI field may be provided in DCI (e.g., in DCI format 1_1) that indicates the transmit beam used by the base station 105-b. For indicating the receive mode, this same field may be expanded, or a new bit field may be added to the DCI, that indicates the receive mode. For example, in cases where separate CSI process IDs are configured for different receive modes, the base station 105-b may indicate the index of the CSI process ID (e.g., via a RRC parameter CSI-ReportConfigId).

In further cases, the receive mode may be implicitly indicated in the DCI, and the UE 115-b may determine the receive beam to use for a downlink transmission based on one or more parameters provided in the DCI. In some examples, the UE 115-b may determine the receive beam for a downlink transmission based on one or more of the scheduled RI or MCS fields (in conjunction with the TCI state of scheduled data). For example, the measurement report for the first receive beam 315 may indicate a first RI and a first MCS, and the measurement report for the second receive beam 320 may indicate a second RI and a second MCS. In such cases, when the DCI indicates the first RI and the first MCS, the UE 115-b may determine that the first receive beam 315 is to be used for the downlink transmission. In some cases, if the DCI indicates a scheduled RI rank and MCS that are not the same as indicated in a provided measurement report, then a receive beam having parameters closest to the scheduled parameters may be selected. In some cases, a distance metric may be defined that identifies a distance between different RI and MCS values, and the receive beam having parameters closest to the scheduled parameters is determined based on the distance metric.

As indicated above, techniques provided herein may also provide two or more uplink transmission beams that are mapped to a same uplink receive beam at a base station. In some cases, if beam correspondence holds at the base station and UE, the receive beamforming parameters at the base station are the same as or directly derived from the transmit beamforming parameters at the base station (e.g., a transmit beam of a NZP-CSI-RS resource).

Figure 4:
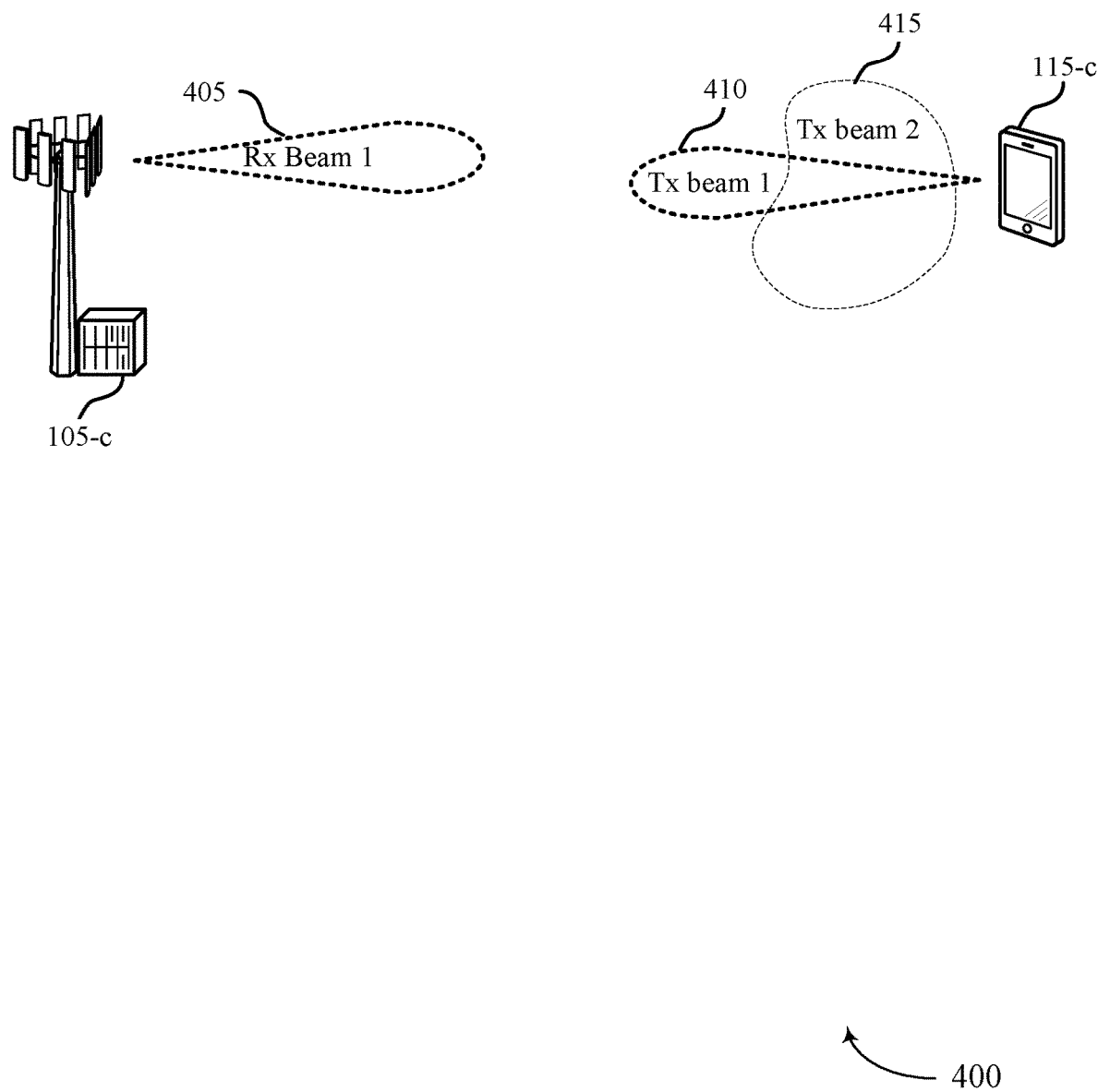
FIG. 4 illustrates an example of multiple transmit beams mapped to a receive beam that support multiple beams in wireless transmissions in accordance with aspects of the present disclosure.

FIG. 4 illustrates an example 400 of multiple transmit beams mapped to a receive beam that supports multiple beams in wireless transmissions in accordance with aspects of the present disclosure. In some examples, transmit beams and receive beams may implement aspects of wireless communications system 100 or 200. In this example, a base station 105-c and a UE 115-c may communicate using beamformed transmissions. In this example, a first uplink transmit beam 410 and a second uplink transmit beam 415 may be spatially associated with a single uplink receive beam 405.

In some cases, different uplink transmit beams 410 and 415 may each correspond to a different transmit mode at the UE 115-c, and have different transmit beamforming parameters. When performing uplink CSI acquisition for the different transmit modes, the base station 105-c may configure resources for multiple instances of a SRS to be transmitted by the UE 115-c. In some cases, the UE 115-c may be configured with multiple SRS resources associated with the same NZP-CSI-RS resources, and for each SRS resource the UE 115-c may use different transmit beams (e.g., first transmit beam 410 and second transmit beam 415). In other cases, a single periodic or semi-persistent SRS may be configured, and the UE 115-c may switch around its transmit beams in a time division multiplexing manner, similarly as discussed above for CSI-RS transmissions from a base station.

The base station 105-c, after performing measurements associated with the multiple instances of SRS transmissions via the different transmit beams, may allocate uplink resources for uplink transmissions from the UE 115-c. In some cases, the base station 105-c may indicate which uplink transmission beam is to be used by the UE 115-c. In some cases, DCI may be transmitted to the UE 115-c that indicates the allocated uplink resources. The DCI may have a format (e.g., DCI format 0_1) that includes a SRS resource indicator that is used to indicate the uplink data (e.g., PUSCH) transmission beam. In some cases, such a DCI transmission may include an extended field for the SRS resource indicator, or a separate field, that indicates which of the first uplink transmit beam 410 or second uplink transmit beam 415 is to be used for the uplink transmission.

Figure 5:
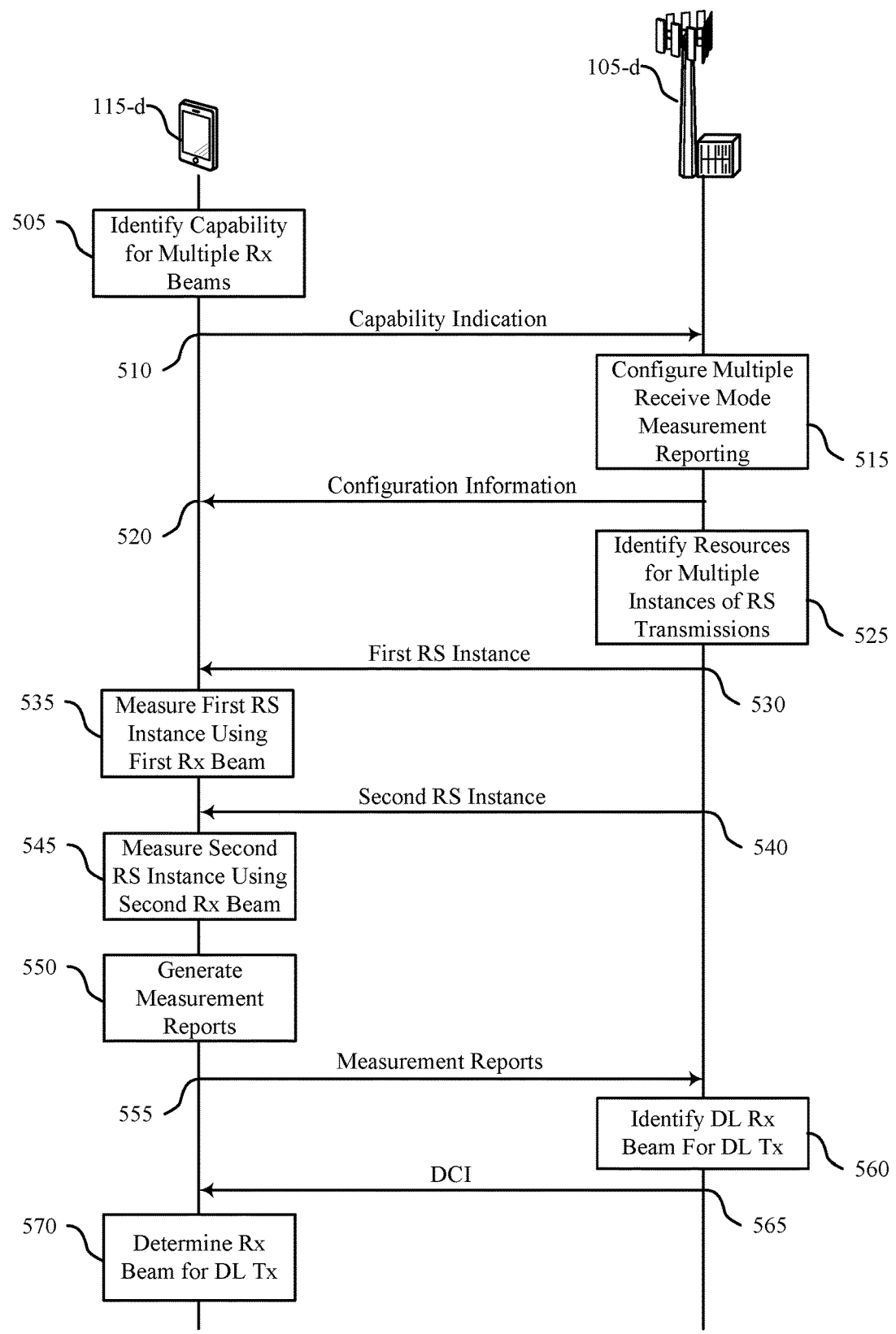
FIG. 5 illustrates an example of a process flow that supports multiple beams in wireless transmissions in accordance with aspects of the present disclosure.

FIG. 5 illustrates an example of a process flow 500 that supports multiple beams in wireless transmissions in accordance with aspects of the present disclosure. In some examples, process flow 500 may implement aspects of wireless communications system 100 or 200. In this example, process flow 500 includes UE 115-d and base station 105-d, which may examples of the corresponding devices described with reference to FIGS. 1 and 2.

At 505, the UE 115-d may identify a capability for supporting multiple receive beams that may be mapped to a same transmit beam. In some cases, the capability may be determined based on one or more conditions at the UE 115-d. For example, the UE 115-d may have sufficient processing capabilities and power to support different receive beams, and the UE 115-d may determine a number of different receive beams that may be supported. In other cases, the UE 115-d may be power limited, and additional measurement reports and reporting associated with multiple receive beams may be undesirable, and the UE 115-d may determine that just a single receive beam is to be configured. In some cases, the capability may be based on a category of the UE 115-d. The UE 115-d may transmit a capability indication 510 to the base station 105-d that may indicate that multiple receive beams are supported, and may also indicate a number of receive beams that the UE 115-d may support.

At 515, the base station 105-d may configure multiple receive mode measurement reporting. In some cases, a same TCI state may be configured for multiple receive mode measurement reports. In some cases, multiple CSI-RS processes may be configured for a particular TCI state, with each CSI-RS process corresponding to a different receive beam and associated receive beamforming parameters at the UE 115-d. In other cases, a same CSI-RS process may be used, and different instances of CSI-RS transmissions may be multiplexed across different receive beams at the UE 115-*d*. The base station 105-*d* may transmit the configuration information 520 to the UE 115-*d*.

At 525, the base station 105-*d* may identify resources for multiple instances of RS transmissions. In some cases, the base station 105-*d* may identify a number of CSI-RS instances that may be multiplexed across different receive beams at the UE 115-*d*. In some cases, the base station 105-*d* may identify different CSI-RS process IDs for the different instances of CSI-RS transmissions. The base station 105-*d* may transmit a first RS instance 530 to the UE 115-*d* based on the identified resources.

At 535, the UE 115-*d* may measure the first RS instance using a first receive beam. The first receive beam may use first receive beamforming parameters, and have an associated beam pattern. The first receive beam may be associated with a first receive mode at the UE 115-*d*. In some cases, the UE 115-*d* may measure CQI for the CSI-RS transmission, and may determine a supported transmission rank, and may identify one or more MCS that could be supported based on the CQI.

The base station 105-*d* may transmit a second RS instance 540, which may be received at the UE 115-*d*. At 545, the UE 115-*d* may measure the second RS instance 540 using a second receive beam. The second receive beam may use second receive beamforming parameters, and have an associated beam pattern. The second receive beam may be associated with a second receive mode at the UE 115-*d*. In some cases, the UE 115-*d* may again measure CQI for the CSI-RS transmission, and may determine a supported transmission rank, and may identify one or more MCS that could be supported based on the CQI.

At 550, the UE 115-*d* may generate measurement reports for the first CSI-RS and the second CSI-RS instances. In some cases, separate measurement reports may be generated and transmitted after receiving each instance of the CSI-RS. The measurement reports may include the measured CQI and also provide a RI. The UE 115-*d* may transmit measurement reports 555 to the base station 105-*d*.

At 560, the base station 105-*d* may identify a downlink receive beam that is to be used at the UE 115-*d* for a downlink transmission. In some cases, the base station 105-*d* may allocate downlink resources for a downlink transmission for the identified downlink receive beam, and may indicate the downlink resources and the receive beam that is to be used at the UE 115-*d* in DCI 565 that is transmitted to the UE 115-*d*. In some cases, the DCI may explicitly indicate the receive beam or receive mode that is to be used at the UE 115-*d*. In other cases, the indication of the receive beam may be implicit based on one or more other parameters in the DCI (e.g., RI, MCS, PMI, etc.).

At 570, the UE 115-*d* may determine the receive beam for the downlink transmission, and determine the allocated downlink resources. In cases where the receive beam is explicitly indicated, the UE 115-*d* may adjust receive circuitry to have the beamforming parameters of the indicated receive beam. In cases where the receive beam is implicitly indicated, the UE 115-*d* may compare one or more parameters provided in the DCI to one or more parameters of each of the receive beams, and select the receive beam based on the comparison. The base station 105-*d* may then transmit the downlink transmission which may be received, demodulated and decoded in accordance with the particular receive beam used by the UE 115-*d*.

Figure 6:
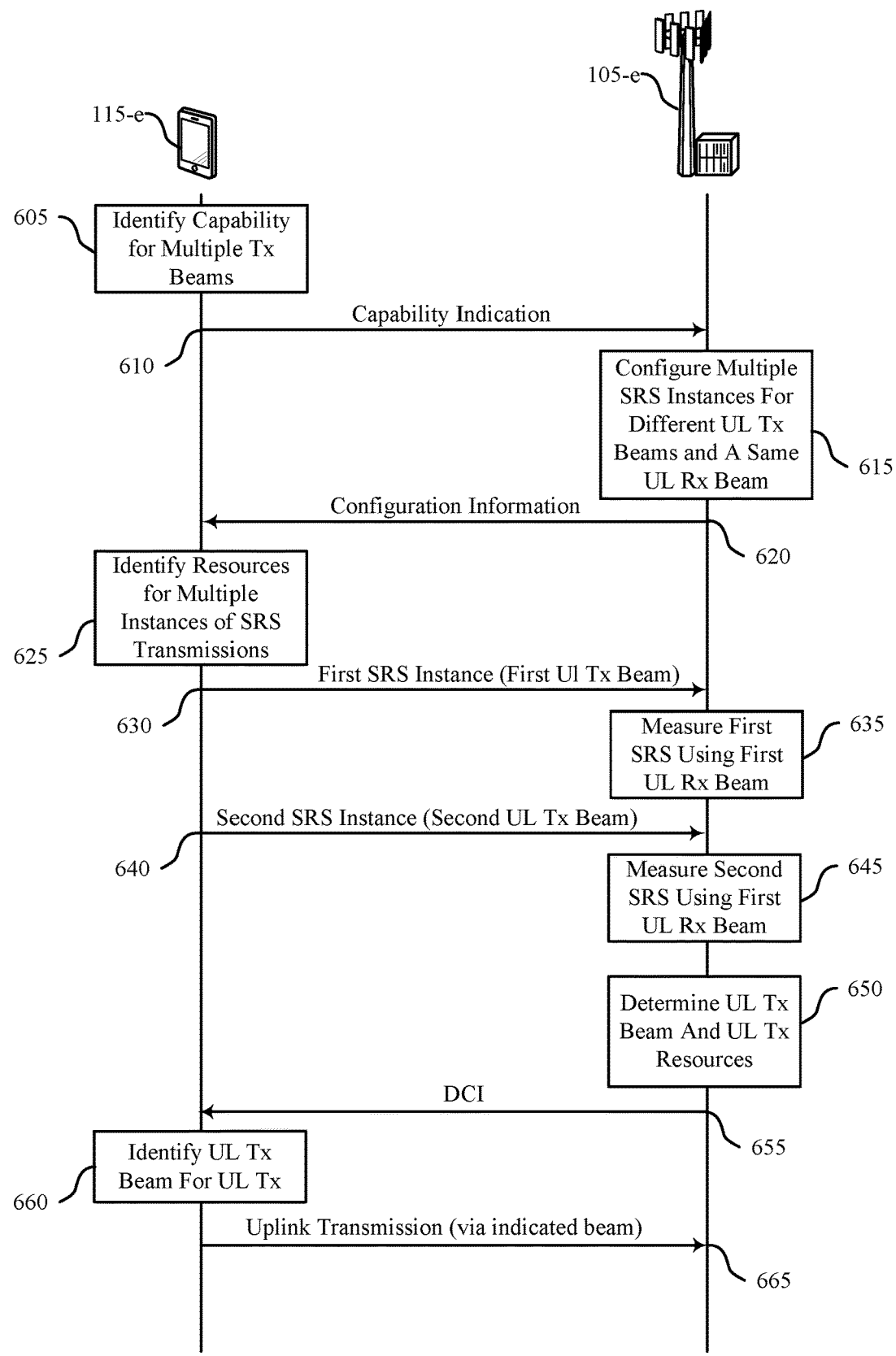
FIG. 6 illustrates another example of a process flow that supports multiple beams in wireless transmissions in accordance with aspects of the present disclosure.

FIG. 6 illustrates an example of a process flow 600 that supports multiple beams in wireless transmissions in accordance with aspects of the present disclosure. In some examples, process flow 600 may implement aspects of wireless communications system 100 or 200. In this example, process flow 600 includes UE 115-*e* and base station 105-*e*, which may examples of the corresponding devices described with reference to FIGS. 1 and 2.

At 605, the UE 115-*e* may identify a capability for supporting multiple uplink transmit beams that may be mapped to a same uplink receive beam. In some cases, the capability may be determined based on one or more conditions at the UE 115-*e*. For example, the UE 115-*e* may have sufficient processing capabilities and power to support different transmit beams, and the UE 115-*e* may determine a number of different transmit beams that may be supported. In some cases, the capability may be based on a category of the UE 115-*e*. The UE 115-*e* may transmit a capability indication 610 to the base station 105-*e* that may indicate that multiple transmit beams are supported, and may also indicate a number of transmit beams that the UE 115-*e* may support.

At 615, the base station 105-*e* may configure multiple SRS instances for different uplink transmit beams that are to be received via a same uplink receive beam. In some cases, a same TCI state may be configured for multiple uplink transmit beams. The base station 105-*e* may transmit the configuration information 620 to the UE 115-*e*.

At 625, the UE 115-*e* may identify resources for transmission of multiple instances of SRS transmissions via multiple uplink transmit beams. In some case, the SRS transmissions with different uplink transmit beams may be time division multiplexed across SRS occasions.

The UE 115-*e* may transmit a first SRS instance 630 via a first uplink transmit beam, which may be received at the base station 105-*e* via a first uplink receive beam. At 635, the base station 105-*e* measure the first SRS instance using the first uplink receive beam. The UE 115-*e* may transmit a second SRS instance 640 via a second uplink transmit beam, which may also be received at the base station 105-*e*. At 645, the base station 105-*e* measure the second SRS instance using the first uplink receive beam.

At 650, the base station 105-*e* may determine an uplink transmit beam and uplink transmission resources for an uplink transmission from the UE 115-*e*. In some cases, the selection of the uplink transmit beam may be based on one or more conditions at the UE 115-*e*, such as an EI or TI reported by the UE 115-*e*. The base station 105-*e* may format DCI that indicates allocated uplink resources and an uplink transmit beam that is to be used by the UE 115-*e*, and may transmit the DCI 655 to the UE 115-*e*.

At 660, the UE 115-*e* may receive the DCI and identify an uplink transmission beam for uplink transmissions to the base station 105-*e*. In some cases, the uplink transmission beam may be explicitly indicated in the DCI. In other cases, the uplink transmission beam may be implicitly indicated in the DCI, and the UE 115-*e* may determine the uplink transmission beam based on one or more parameters indicated in the DCI (e.g., an MCS indicated in the DCI). The UE 115-*e* may transmit the uplink transmission 665 via the indicated beam.

Figure 7:
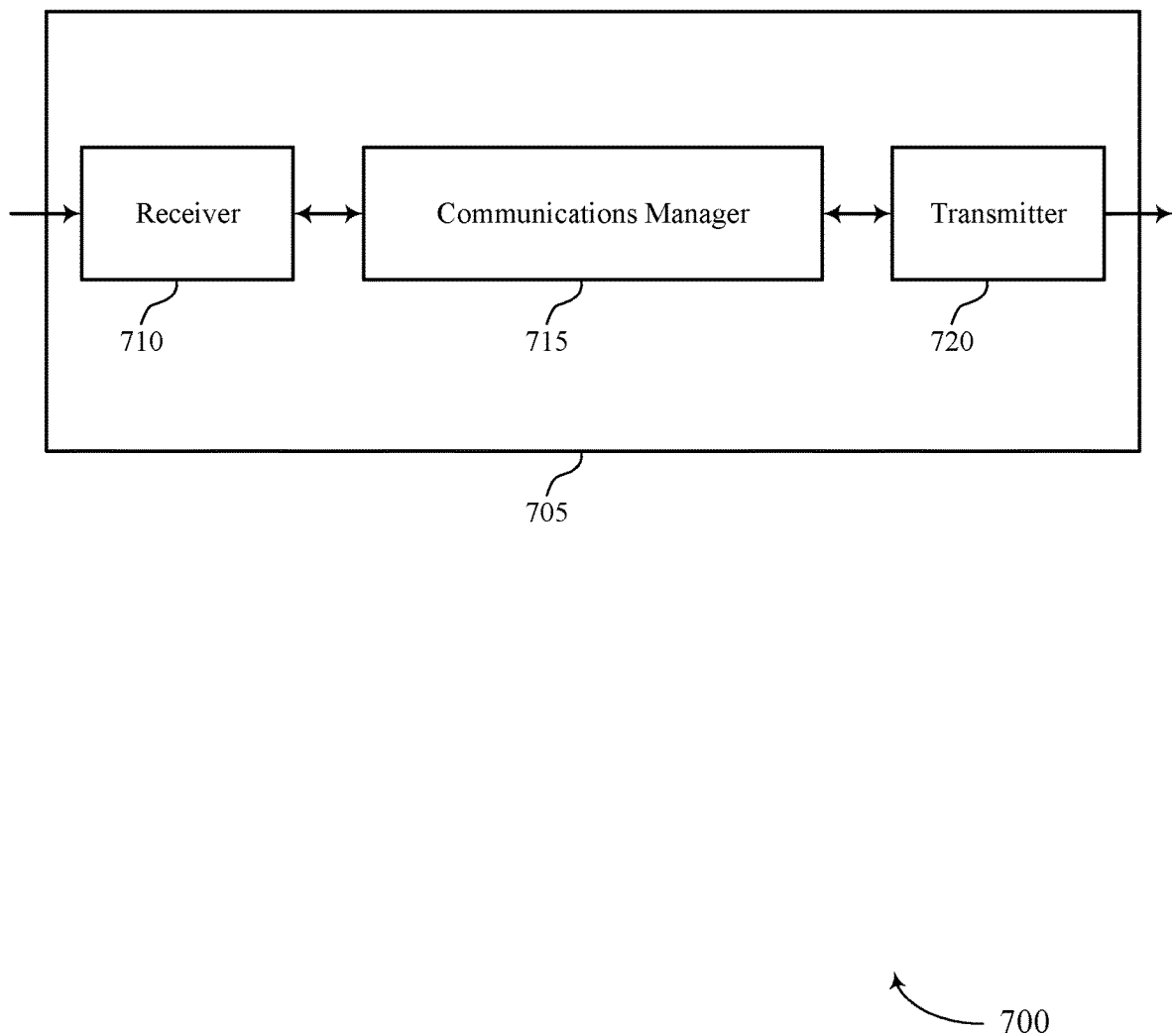
FIGS. 7 and 8 show block diagrams of devices that support multiple beams in wireless transmissions in accordance with aspects of the present disclosure.

FIG. 7 shows a block diagram 700 of a device 705 that supports multiple beams in wireless transmissions in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to supporting multiple beams in wireless transmissions, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive two or more instances of a first reference signal transmitted via a first transmit beam from a base station, measure at least a first instance of the first reference signal using a first set of receive beamforming parameters to generate a first measurement report, measure at least a second instance of the first reference signal using a second set of receive beamforming parameters to generate a second measurement report, and transmit the first measurement report and the second measurement report to the base station.

Additionally or alternatively, the communications manager 715 may determine that two or more different uplink transmission beams are to be configured for uplink transmissions to a base station, each of the two or more different uplink transmission beams having different transmit beamforming parameters and each of the two or more different uplink transmission beams spatially associated with a single set of uplink receive beamforming parameters at the base station. The communications manager 715 may transmit an indication to the base station that the first uplink transmission beam or the second uplink transmission beam is used for an uplink transmission, transmit a first instance of a first reference signal to the base station using a first uplink transmission beam, and transmit a second instance of the first reference signal to the base station using a second uplink transmission beam. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
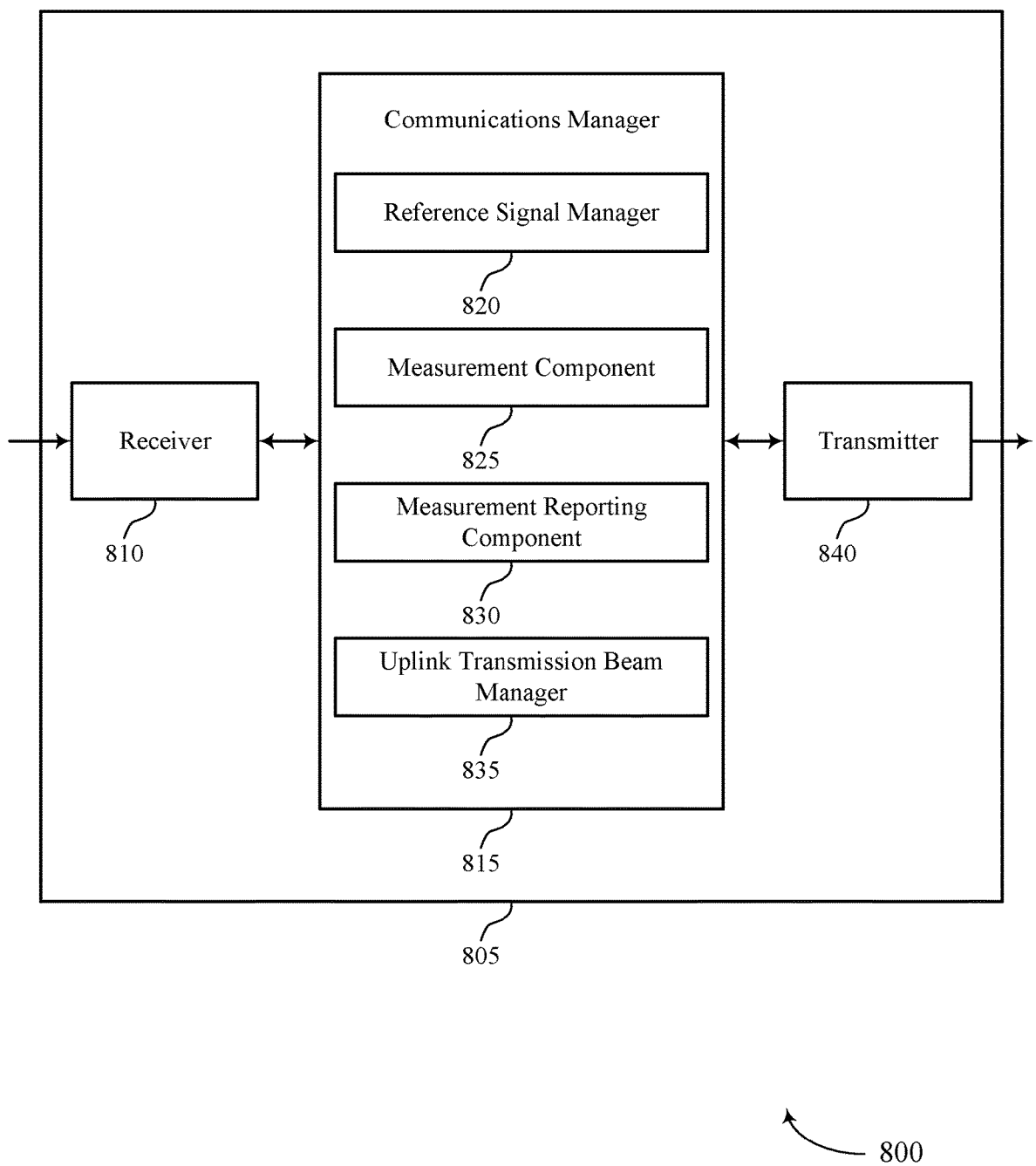

FIG. 8 shows a block diagram 800 of a device 805 that supports multiple beams in wireless transmissions in accordance with aspects of the present disclosure. The device 805 may be an example of aspects of a device 705 or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to supporting multiple beams in wireless transmissions, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a reference signal manager 820, a measurement component 825, a measurement reporting component 830, and an uplink transmission beam manager 835. The communications manager 815 may be an example of aspects of the communications manager 1010 described herein.

The reference signal manager 820 may receive two or more instances of a first reference signal transmitted via a first transmit beam from a base station.

The measurement component 825 may measure at least a first instance of the first reference signal using a first set of receive beamforming parameters to generate a first measurement report and measure at least a second instance of the first reference signal using a second set of receive beamforming parameters to generate a second measurement report.

The measurement reporting component 830 may transmit the first measurement report and the second measurement report to the base station.

The uplink transmission beam manager 835 may determine that two or more different uplink transmission beams are to be configured for uplink transmissions to a base station, each of the two or more different uplink transmission beams having different transmit beamforming parameters and each of the two or more different uplink transmission beams spatially associated with a single set of uplink receive beamforming parameters at the base station and transmit an indication to the base station that the first uplink transmission beam or the second uplink transmission beam is used for an uplink transmission.

The reference signal manager 820 may transmit a first instance of a first reference signal to the base station using a first uplink transmission beam and transmit a second instance of the first reference signal to the base station using a second uplink transmission beam.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
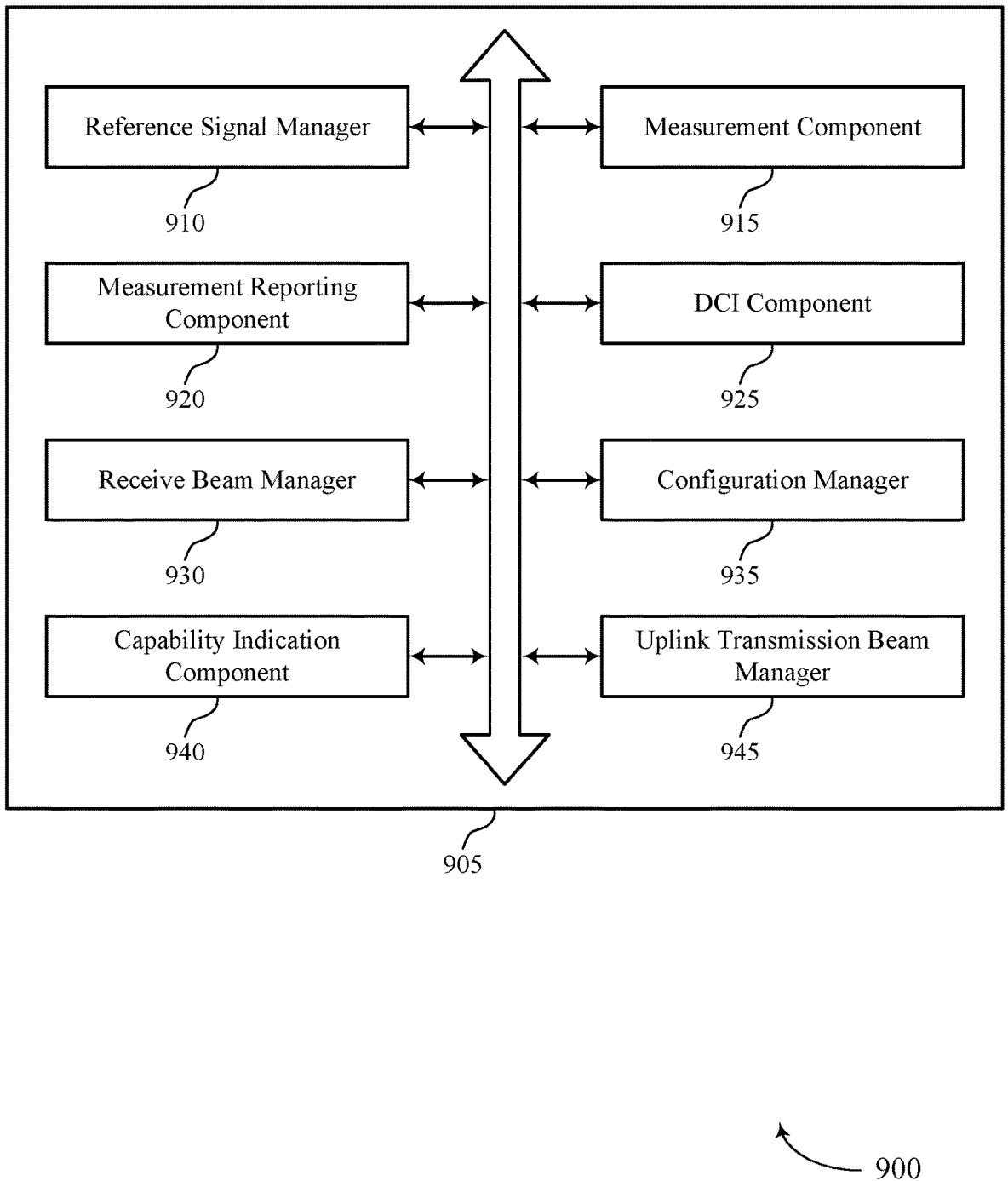
FIG. 9 shows a block diagram of a communications manager that supports multiple beams in wireless transmissions in accordance with aspects of the present disclosure.

FIG. 9 shows a block diagram 900 of a communications manager 905 that supports multiple beams in wireless transmissions in accordance with aspects of the present disclosure. The communications manager 905 may be an example of aspects of a communications manager 715, a communications manager 815, or a communications manager 1010 described herein. The communications manager 905 may include a reference signal manager 910, a measurement component 915, a measurement reporting component 920, a DCI component 925, a receive beam manager 930, a configuration manager 935, a capability indication component 940, and an uplink transmission beam manager 945. Each of these modules may communicate, directly or indirectly, with one another (e.g., via one or more buses).

The reference signal manager 910 may receive two or more instances of a first reference signal transmitted via a first transmit beam from a base station. In some cases, the two or more instances of the reference signal may be received in different receive modes that have different receive beams and different receive beamforming parameters.

In some examples, the reference signal manager 910 may transmit a first instance of a first reference signal to the base station using a first uplink transmission beam. In some examples, the reference signal manager 910 may transmit a second instance of the first reference signal to the base station using a second uplink transmission beam. In some cases, the reference signals may include two or more SRSs, and two or more SRS resources include aperiodic, periodic, or semi-persistent SRS resources, and the two or more uplink transmission beams are multiplexed across the two or more SRS resources. In some cases, the configuration information configures multiplexing of the two or more uplink transmission beams across the two or more SRS resources.

The measurement component 915 may measure at least a first instance of the first reference signal using a first set of receive beamforming parameters to generate a first measurement report. In some examples, the measurement component 915 may measure at least a second instance of the first reference signal using a second set of receive beamforming parameters to generate a second measurement report. In some examples, the measuring of the first instance of the first reference signal within a slot is performed using the first set of receive beamforming parameters, and the measuring of the second instance of the first reference signal within the slot is performed using the second set of receive beamforming parameters. In some cases, the measuring of the first reference signal using the first set of receive beamforming parameters is performed at even measurement and reporting occasions, and the measuring of the second set of receive beamforming parameters is performed at odd measurement and reporting occasions. In some cases, the measurement and reporting occasions correspond to transmission slots in a radio frame structure. In some cases, the configuration information indicates two or more sets of resources for the two or more instances of the first reference signal within a slot.

The measurement reporting component 920 may transmit the first measurement report and the second measurement report to the base station. In some examples, the first measurement report is generated responsive to receiving a first CSI process ID and the second measurement report is generated responsive to receiving a second CSI process ID. In some cases, each of the first measurement report and the second measurement report include one or more of a CQI based on the associated receive beamforming parameters, a PMI based on the associated receive beamforming parameters, a RI based on associated receive beamforming parameters, or combinations thereof. In some cases, the first CSI process ID is received via RRC signaling associated with the first instance of the first reference signal and the second CSI process ID is received via RRC signaling associated with the second instance of the first reference signal.

The uplink transmission beam manager 945 may determine that two or more different uplink transmission beams are to be configured for uplink transmissions to a base station, each of the two or more different uplink transmission beams having different transmit beamforming parameters and each of the two or more different uplink transmission beams spatially associated with a single set of uplink receive beamforming parameters at the base station. In some examples, the uplink transmission beam manager 945 may transmit an indication to the base station that the first uplink transmission beam or the second uplink transmission beam is used for an uplink transmission. In some cases, the configuration information further includes an uplink transmission beam indication field that indicates an uplink transmission beam that is to be used for the uplink transmission.

The DCI component 925 may receive DCI from the base station. In some examples, the DCI component 925 may receive a trigger for an aperiodic CSI-RS, the trigger including a CSI request field that indicates whether the first set of receive beamforming parameters or the second set of receive beamforming parameters are to be used for measuring the CSI-RS. In some examples, the DCI component 925 may receive a TCI indicator in the DCI that indicates whether the first set of receive beamforming parameters or the second set of receive beamforming parameters are to be used for the downlink transmission.

The receive beam manager 930 may determine, based on the DCI, which of the first set of receive beamforming parameters or the second set of receive beamforming parameters are to be used for receiving a downlink transmission associated with the DCI. In some examples, the receive beam manager 930 may transmit, prior to receiving the two or more instances of the first reference signal, an indication of which of the first set of receive beamforming parameters or the second set of receive beamforming parameters is preferred for the downlink transmission. In some examples, the receive beam manager 930 may identify one or more parameters associated with the downlink transmission. In some examples, the receive beam manager 930 may determine whether the first set of receive beamforming parameters or the second set of receive beamforming parameters are to be used for the downlink transmission based on the one or more parameters associated with the downlink transmissions.

In some examples, the receive beam manager 930 may identify a first RI and a first MCS associated with the first measurement report and a second RI and second MCS associated with the second measurement report. In some examples, the receive beam manager 930 may determine that the first set of receive beamforming parameters are to be used for the downlink transmission based on the signaled RI and signaled MCS matching the first RI and the first MCS or a distance metric corresponding to different RI and MCS values. In some examples, the receive beam manager 930 may determine that the second set of receive beamforming parameters are to be used for the downlink transmission based on the signaled RI and signaled MCS matching the second RI and the second MCS or the distance metric.

In some examples, the receive beam manager 930 may identify a first RI and a first MCS associated with the first measurement report and a second RI and second MCS associated with the second measurement report. In some examples, the receive beam manager 930 may select the first set of receive beamforming parameters or the second set of receive beamforming parameters based on which of the first RI and the first MCS or the second RI and the second MCS is closer to the signaled RI and signaled MCS based on a distance metric. In some examples, receive beamforming parameters may include one or more of antenna phase parameters for a receive beam pattern, antenna RF frontend gains, a RF path, a baseband clock mode, or any combination thereof. In some cases, the indication of a preferred receive beam includes an energy indicator (EI), a thermal indicator (TI), a request provided in an uplink transmission, or any combination thereof.

The configuration manager 935 may receive configuration information from the base station that configures two or more CSI processes for a first transmission configuration indication (TCI) state, where the first TCI state corresponds to a set of transmission beamforming parameters for the first transmit beam. In some examples, the configuration manager 935 may receive configuration information from the base station that configures multiplexing of the measuring of the first reference signal using the first set of receive beamforming parameters and the second set of receive beamforming parameters. In some examples, the configuration manager 935 may receive configuration information from the base station that configures two or more SRS resources for two or more instances of a SRS transmission using each of the two or more uplink transmission beams.

The capability indication component 940 may transmit, prior to receiving the configuration information, an indication of a number of different receive beamforming parameters that can be configured at the UE. In some examples, the capability indication component 940 may transmit, prior to the determining, an indication of a number of different transmission beams that can be configured at the UE.

Figure 10:
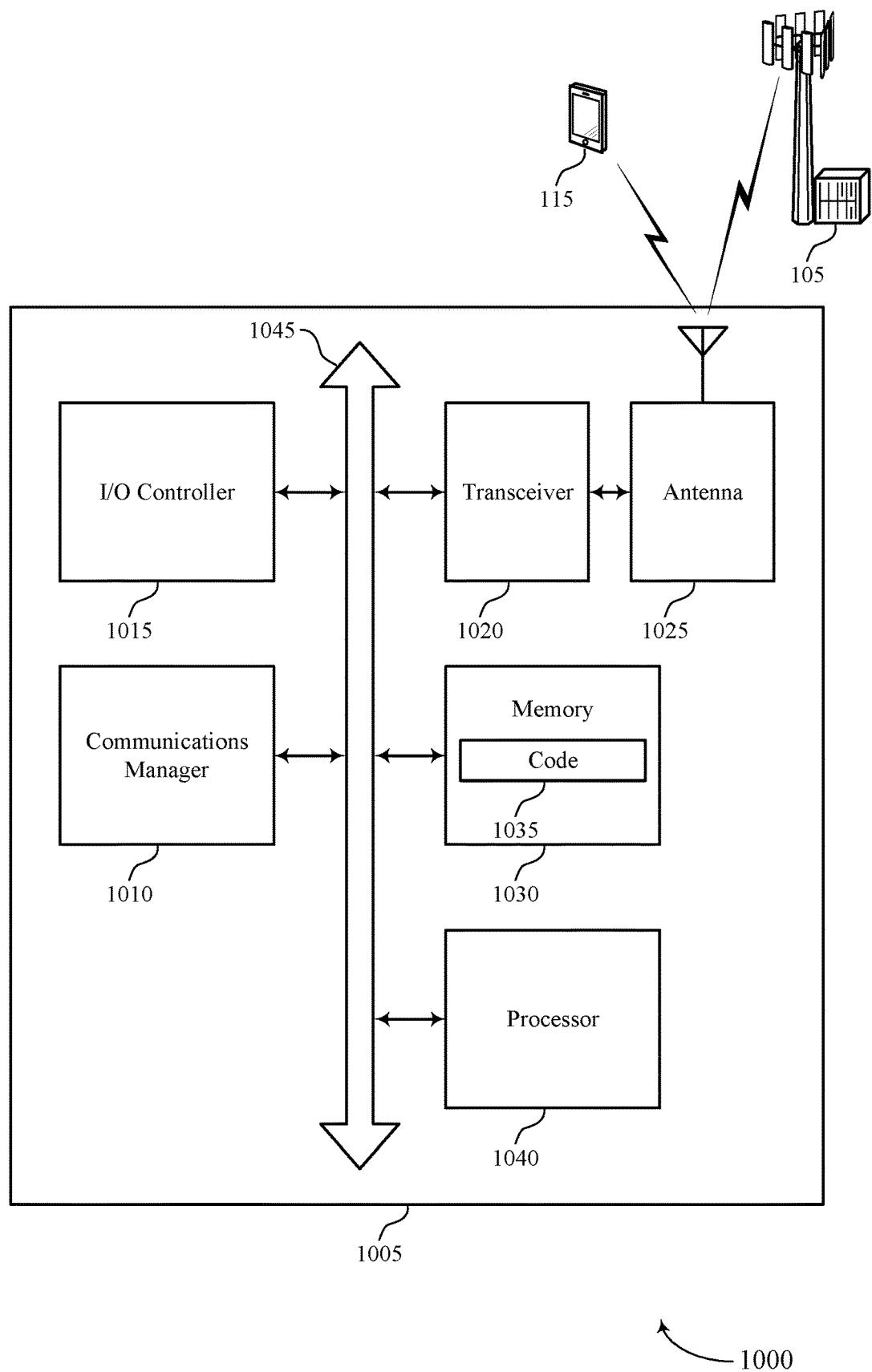
FIG. 10 shows a diagram of a system including a device that supports multiple beams in wireless transmissions in accordance with aspects of the present disclosure.

FIG. 10 shows a diagram of a system 1000 including a device 1005 that supports multiple beams in wireless transmissions in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive two or more instances of a first reference signal transmitted via a first transmit beam from a base station, measure at least a first instance of the first reference signal using a first set of receive beamforming parameters to generate a first measurement report, measure at least a second instance of the first reference signal using a second set of receive beamforming parameters to generate a second measurement report, and transmit the first measurement report and the second measurement report to the base station. The communications manager 1010 may also determine that two or more different uplink transmission beams are to be configured for uplink transmissions to a base station, each of the two or more different uplink transmission beams having different transmit beamforming parameters and each of the two or more different uplink transmission beams spatially associated with a single set of uplink receive beamforming parameters at the base station, transmit an indication to the base station that the first uplink transmission beam or the second uplink transmission beam is used for an uplink transmission, transmit a first instance of a first reference signal to the base station using a first uplink transmission beam, and transmit a second instance of the first reference signal to the base station using a second uplink transmission beam.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting multiple beams in wireless transmissions).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
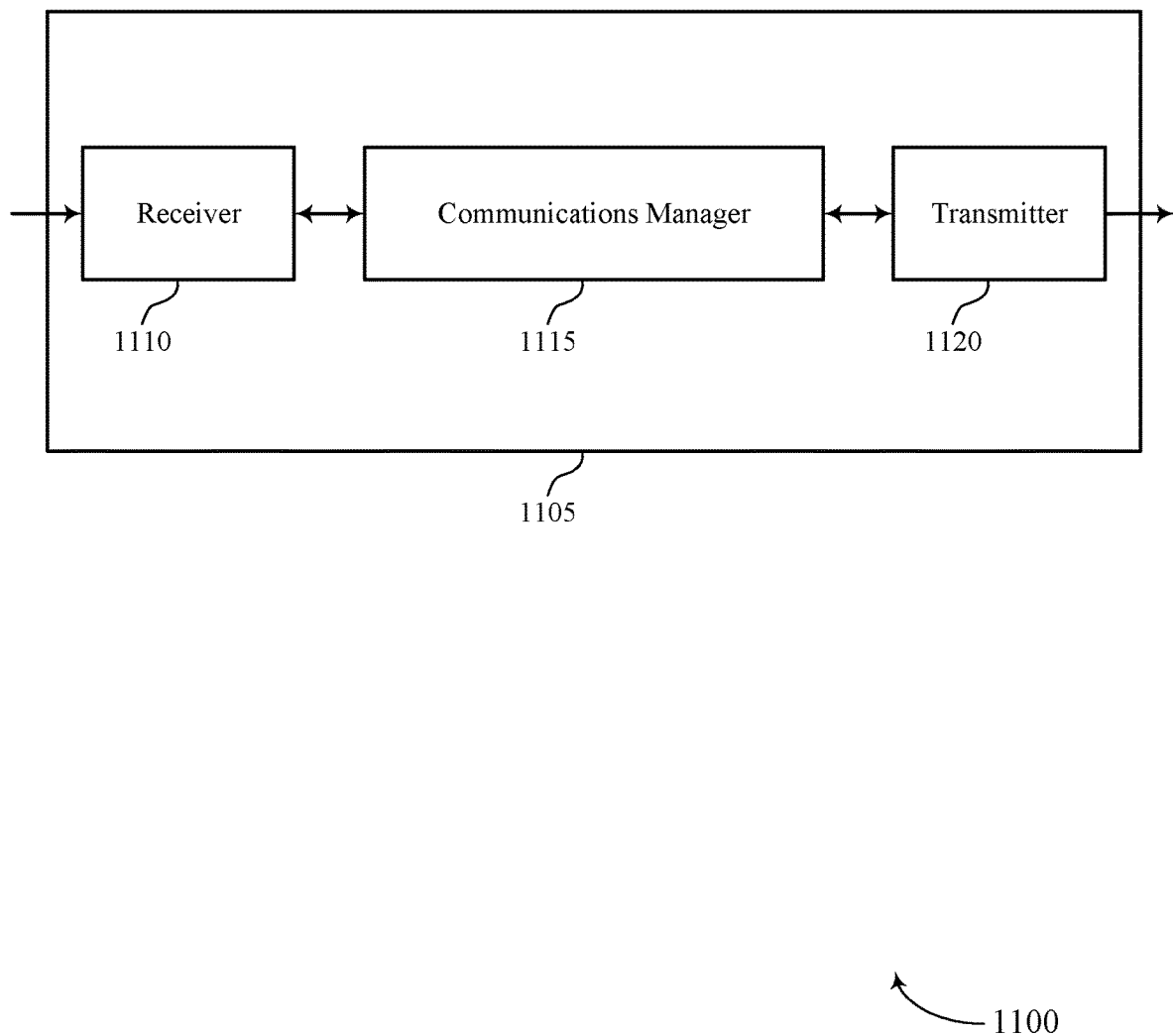
FIGS. 11 and 12 show block diagrams of devices that support multiple beams in wireless transmissions in accordance with aspects of the present disclosure.

FIG. 11 shows a block diagram 1100 of a device 1105 that supports multiple beams in wireless transmissions in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to supporting multiple beams in wireless transmissions, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine that a UE is capable of using two or more different sets of receive beamforming parameters for receiving downlink transmissions from the base station via a first transmit beam, transmit two or more instances of a first reference signal to the UE, and receive two or more measurement reports from the UE corresponding to the two or more different sets of receive beamforming parameters.

Additionally or alternatively, the communications manager 1115 may determine that two or more different uplink transmission beams are to be configured for uplink transmissions from a UE, each of the two or more different uplink transmission beams having different transmit beamforming parameters and each of the two or more different uplink transmission beams spatially associated with a single set of uplink receive beamforming parameters of a first receive beam at the base station, measure a first instance of a first reference signal from the UE that is transmitted using a first uplink transmission beam to generate a first set of measurements, measure a second instance of the first reference signal from the UE that is transmitted using a second uplink transmission beam to generate a second set of measurements, and schedule and receive an uplink transmission from the UE via the first receive beam based on the first set of measurements or the second set of measurements. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
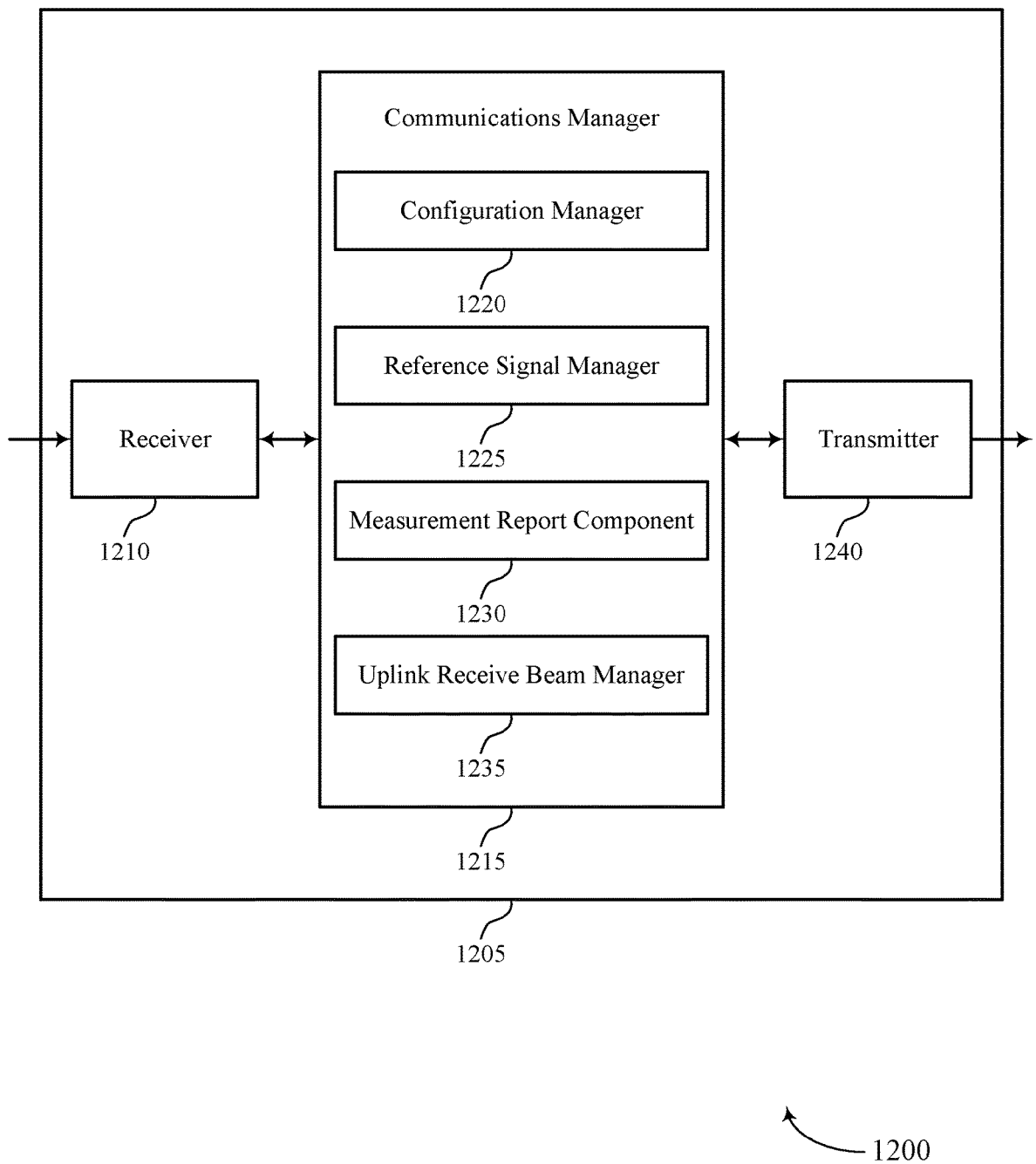

FIG. 12 shows a block diagram 1200 of a device 1205 that supports multiple beams in wireless transmissions in accordance with aspects of the present disclosure. The device 1205 may be an example of aspects of a device 1105 or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to supporting multiple beams in wireless transmissions, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a configuration manager 1220, a reference signal manager 1225, a measurement report component 1230, and an uplink receive beam manager 1235. The communications manager 1215 may be an example of aspects of the communications manager 1410 described herein.

The configuration manager 1220 may determine that a UE is capable of using two or more different sets of receive beamforming parameters for receiving downlink transmissions from the base station via a first transmit beam. In some examples, the configuration manager 1220 may determine that two or more different uplink transmission beams are to be configured for uplink transmissions from a UE, each of the two or more different uplink transmission beams having different transmit beamforming parameters and each of the two or more different uplink transmission beams spatially associated with a single set of uplink receive beamforming parameters of a first receive beam at the base station.

The reference signal manager 1225 may transmit two or more instances of a first reference signal to the UE. In some cases, the reference signal manager 1225 may measure a first instance of a first reference signal from the UE that is transmitted using a first uplink transmission beam to generate a first set of measurements and measure a second instance of the first reference signal from the UE that is transmitted using a second uplink transmission beam to generate a second set of measurements.

The measurement report component 1230 may receive two or more measurement reports from the UE corresponding to the two or more different sets of receive beamforming parameters.

The uplink receive beam manager 1235 may receive an uplink transmission from the UE via the first receive beam based on the first set of measurements or the second set of measurements.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
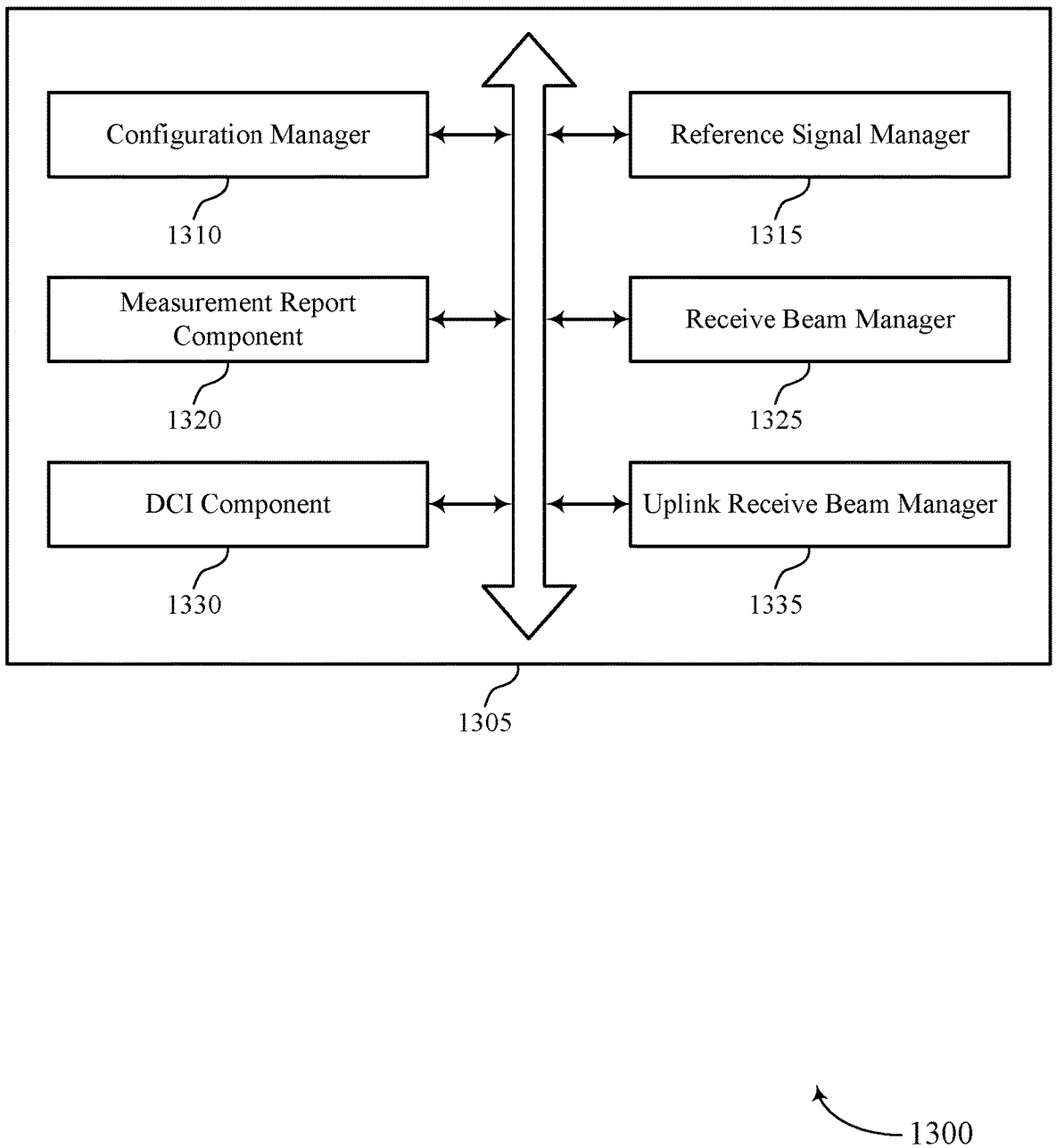
FIG. 13 shows a block diagram of a communications manager that supports multiple beams in wireless transmissions in accordance with aspects of the present disclosure.

FIG. 13 shows a block diagram 1300 of a communications manager 1305 that supports multiple beams in wireless transmissions in accordance with aspects of the present disclosure. The communications manager 1305 may be an example of aspects of a communications manager 1115, a communications manager 1215, or a communications manager 1410 described herein. The communications manager 1305 may include a configuration manager 1310, a reference signal manager 1315, a measurement report component 1320, a receive beam manager 1325, a DCI component 1330, and an uplink receive beam manager 1335. Each of these modules may communicate, directly or indirectly, with one another (e.g., via one or more buses).

The configuration manager 1310 may determine that a UE is capable of using two or more different sets of receive beamforming parameters for receiving downlink transmissions from the base station via a first transmit beam. In some examples, the configuration manager 1310 may determine that two or more different uplink transmission beams are to be configured for uplink transmissions from a UE, each of the two or more different uplink transmission beams having different transmit beamforming parameters and each of the two or more different uplink transmission beams spatially associated with a single set of uplink receive beamforming parameters of a first receive beam at the base station.

In some examples, the configuration manager 1310 may receive, prior to the configuring, an indication of a number of different receive beams that can be configured at the UE. In some examples, the configuration manager 1310 may transmit configuration information to the UE that configures two or more SRS resources for two or more instances of a SRS transmission using each of the two or more uplink transmission beams. In some examples, the configuration manager 1310 may receive, prior to the determining, an indication of a number of different transmission beams that can be configured at the UE.

The reference signal manager 1315 may transmit two or more instances of a first reference signal to the UE. In some examples, the reference signal manager 1315 may configure the UE with two or more CSI processes for a first transmission configuration indication (TCI) state, where the first TCI state corresponds to a set of transmission beamforming parameters for the first transmit beam. In some examples, the reference signal manager 1315 may configure the UE to multiplex the measuring of the first reference signal using the two or more different sets of receive beamforming parameters. In some examples, the reference signal manager 1315 may configure two or more sets of resources for two or more instances of the first reference signal within a slot. In some examples, the reference signal manager 1315 may configure the UE to measure a first instance of the first reference signal within the slot is using a first set of receive beamforming parameters, and to measure a second instance of the first reference signal within the slot is using a second set of receive beamforming parameters.

In some examples, the reference signal manager 1315 may measure a first instance of a first reference signal from the UE that is transmitted using a first uplink transmission beam to generate a first set of measurements. In some examples, the reference signal manager 1315 may measure a second instance of the first reference signal from the UE that is transmitted using a second uplink transmission beam to generate a second set of measurements. In some cases, two or more SRS resources include periodic or semi-persistent SRS resources, and the two or more uplink transmission beams are multiplexed across the two or more SRS resources.

The measurement report component 1320 may receive two or more measurement reports from the UE corresponding to the two or more different sets of receive beamforming parameters. In some cases, each of the two or more measurement reports include one or more of a channel quality indicator (CQI), a precoding matrix indicator (PMI), a rank indicator (RI), or combinations thereof, that are determined based on the two or more different sets of receive beamforming parameters.

The uplink receive beam manager 1335 may receive an uplink transmission from the UE via the first receive beam based on the first set of measurements or the second set of measurements.

The receive beam manager 1325 may, for downlink transmissions, select which of the first receive beam or the second receive beam is to be used by the UE for receiving a downlink transmission. In some examples, the receive beam manager 1325 may receive, prior to the selecting, a beam selection indication from the UE of which of the first receive beam or the second receive beam is preferred for the downlink transmission. In some cases, the beam selection indication includes an EI, a TI, a request provided in an uplink transmission, or any combination thereof.

The DCI component 1330 may transmit an indication in a DCI transmission that the first receive beam or the second receive beam is to be used for receiving the downlink transmission. In some cases, the DCI includes a trigger for an aperiodic CSI-RS, the trigger including a CSI request field that indicates which of the two or more different sets of receive beamforming parameters are to be used for measuring the CSI-RS at the UE. In some cases, the DCI includes a TCI that indicates whether the first receive beam or the second receive beam is to be used by the UE for receiving the downlink transmission.

Figure 14:
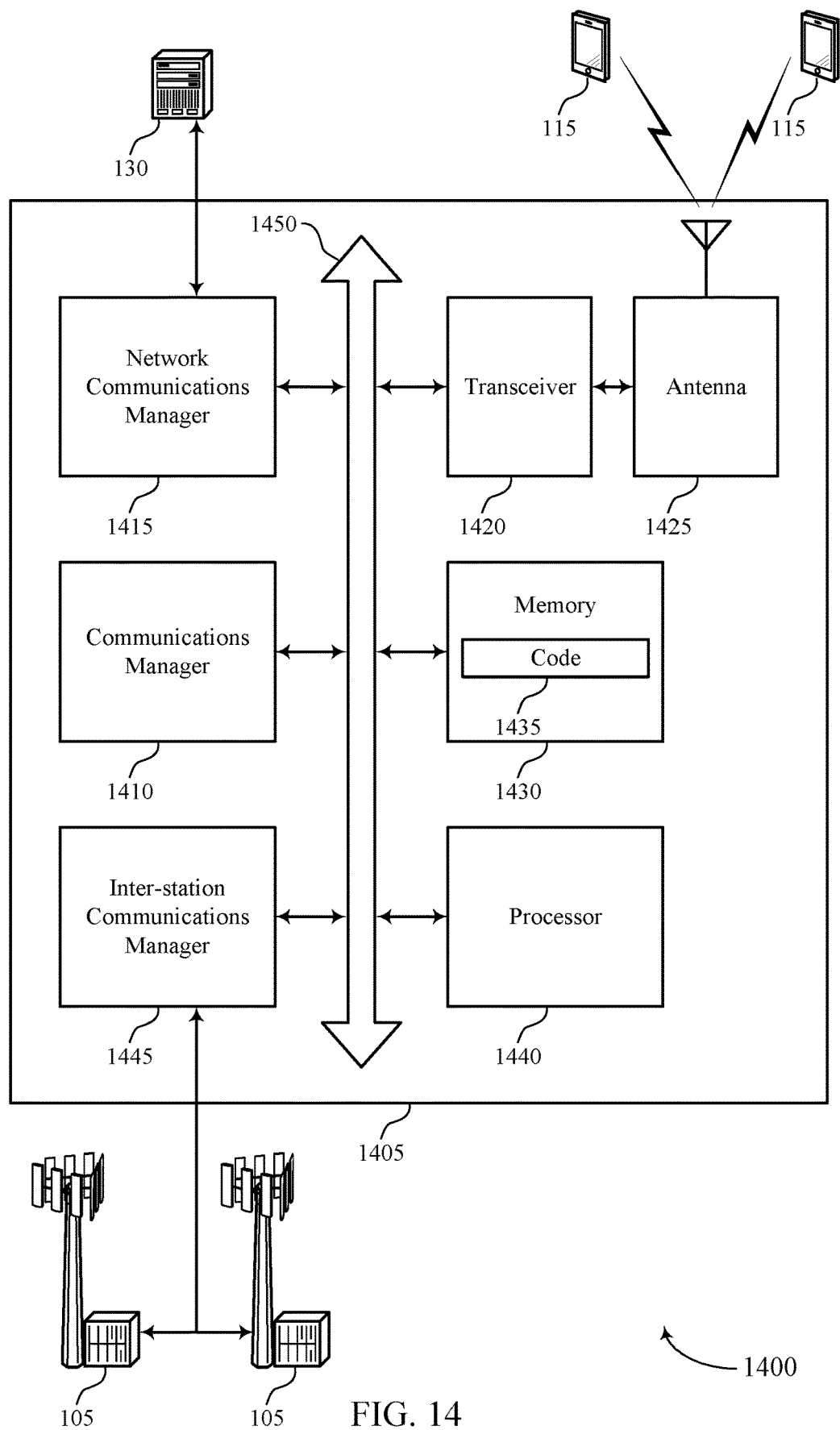
FIG. 14 shows a diagram of a system including a device that supports multiple beams in wireless transmissions in accordance with aspects of the present disclosure.

FIG. 14 shows a diagram of a system 1400 including a device 1405 that supports multiple beams in wireless transmissions in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may determine that a UE is capable of using two or more different sets of receive beamforming parameters for receiving downlink transmissions from the base station via a first transmit beam, transmit two or more instances of a first reference signal to the UE, and receive two or more measurement reports from the UE corresponding to the two or more different sets of receive beamforming parameters. The communications manager 1410 may also determine that two or more different uplink transmission beams are to be configured for uplink transmissions from a UE, each of the two or more different uplink transmission beams having different transmit beamforming parameters and each of the two or more different uplink transmission beams spatially associated with a single set of uplink receive beamforming parameters of a first receive beam at the base station. The communications manager 1410 may also measure a first instance of a first reference signal from the UE that is transmitted using a first uplink transmission beam to generate a first set of measurements, measure a second instance of the first reference signal from the UE that is transmitted using a second uplink transmission beam to generate a second set of measurements, and receive an uplink transmission from the UE via the first receive beam based on the first set of measurements or the second set of measurements.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device to perform various functions (e.g., functions or tasks supporting multiple beams in wireless transmissions).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
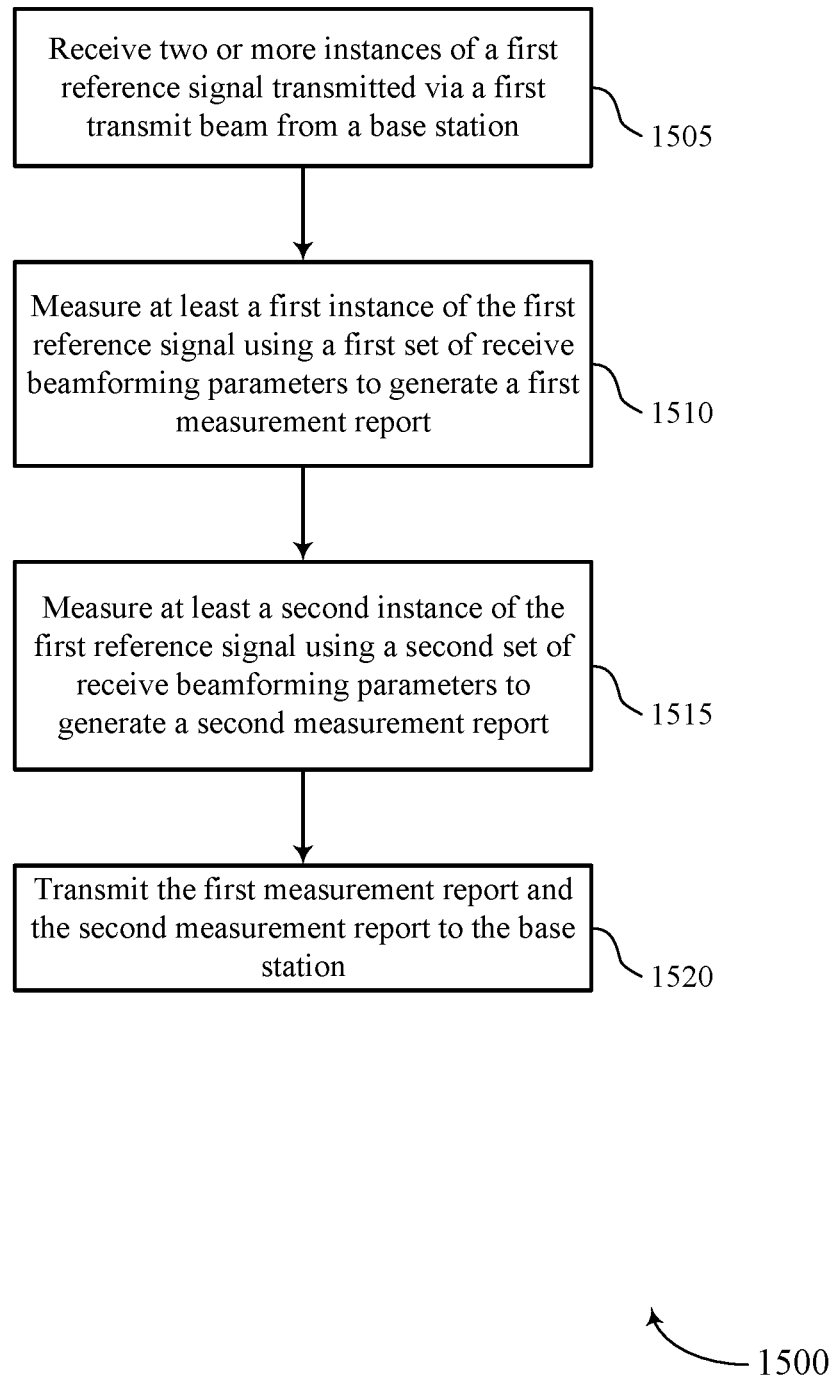
FIGS. 15 through 26 show flowcharts illustrating methods that support multiple beams in wireless transmissions in accordance with aspects of the present disclosure.

FIG. 15 shows a flowchart illustrating a method 1500 that supports multiple beams in wireless transmissions in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive two or more instances of a first reference signal transmitted via a first transmit beam from a base station. The operations of 1505 may be performed according to the methods described herein. In some examples, aspects of the operations of 1505 may be performed by a reference signal manager as described with reference to FIGS. 7 through 10.

At 1510, the UE may measure at least a first instance of the first reference signal using a first set of receive beamforming parameters to generate a first measurement report. The operations of 1510 may be performed according to the methods described herein. In some examples, aspects of the operations of 1510 may be performed by a measurement component as described with reference to FIGS. 7 through 10.

At 1515, the UE may measure at least a second instance of the first reference signal using a second set of receive beamforming parameters to generate a second measurement report. The operations of 1515 may be performed according to the methods described herein. In some examples, aspects of the operations of 1515 may be performed by a measurement component as described with reference to FIGS. 7 through 10.

At 1520, the UE may transmit the first measurement report and the second measurement report to the base station. The operations of 1520 may be performed according to the methods described herein. In some examples, aspects of the operations of 1520 may be performed by a measurement reporting component as described with reference to FIGS. 7 through 10.

Figure 16:
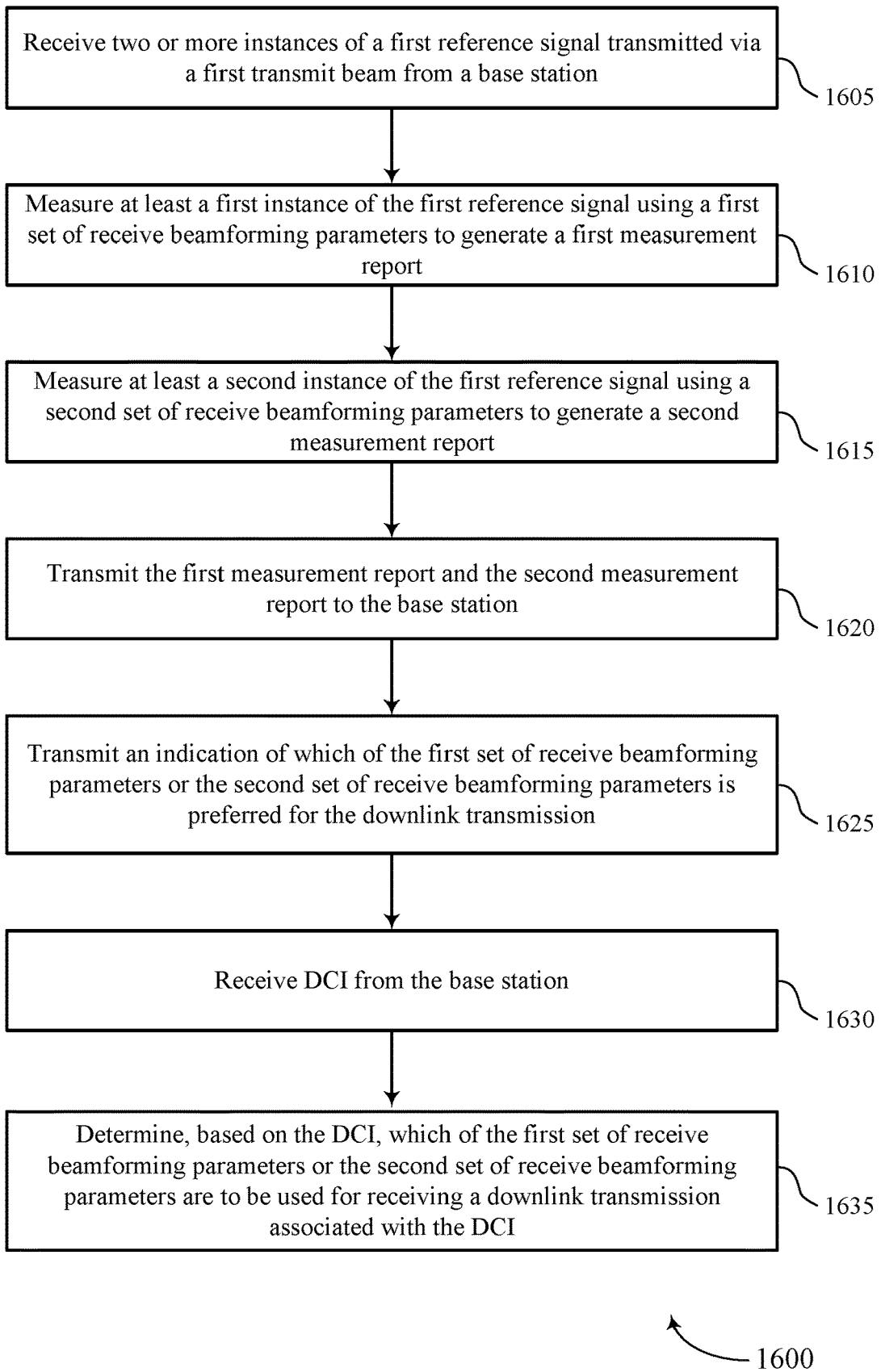

FIG. 16 shows a flowchart illustrating a method 1600 that supports multiple beams in wireless transmissions in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive two or more instances of a first reference signal transmitted via a first transmit beam from a base station. The operations of 1605 may be performed according to the methods described herein. In some examples, aspects of the operations of 1605 may be performed by a reference signal manager as described with reference to FIGS. 7 through 10.

At 1610, the UE may measure at least a first instance of the first reference signal using a first set of receive beamforming parameters to generate a first measurement report. The operations of 1610 may be performed according to the methods described herein. In some examples, aspects of the operations of 1610 may be performed by a measurement component as described with reference to FIGS. 7 through 10.

At 1615, the UE may measure at least a second instance of the first reference signal using a second set of receive beamforming parameters to generate a second measurement report. The operations of 1615 may be performed according to the methods described herein. In some examples, aspects of the operations of 1615 may be performed by a measurement component as described with reference to FIGS. 7 through 10.

At 1620, the UE may transmit the first measurement report and the second measurement report to the base station. The operations of 1620 may be performed according to the methods described herein. In some examples, aspects of the operations of 1620 may be performed by a measurement reporting component as described with reference to FIGS. 7 through 10.

At 1625, the UE transmit an indication of which of the first set of receive beamforming parameters or the second set of receive beamforming parameters is preferred for the downlink transmission. The operations of 1625 may be performed according to the methods described herein. In some examples, aspects of the operations of 1625 may be performed by a receive beam manager as described with reference to FIGS. 7 through 10.

At 1630, the UE may receive DCI from the base station. The operations of 1630 may be performed according to the methods described herein. In some examples, aspects of the operations of 1630 may be performed by a DCI component as described with reference to FIGS. 7 through 10.

At 1635, the UE may determine, based on the DCI, which of the first set of receive beamforming parameters or the second set of receive beamforming parameters are to be used for receiving a downlink transmission associated with the DCI. The operations of 1635 may be performed according to the methods described herein. In some examples, aspects of the operations of 1635 may be performed by a receive beam manager as described with reference to FIGS. 7 through 10.

Figure 17:
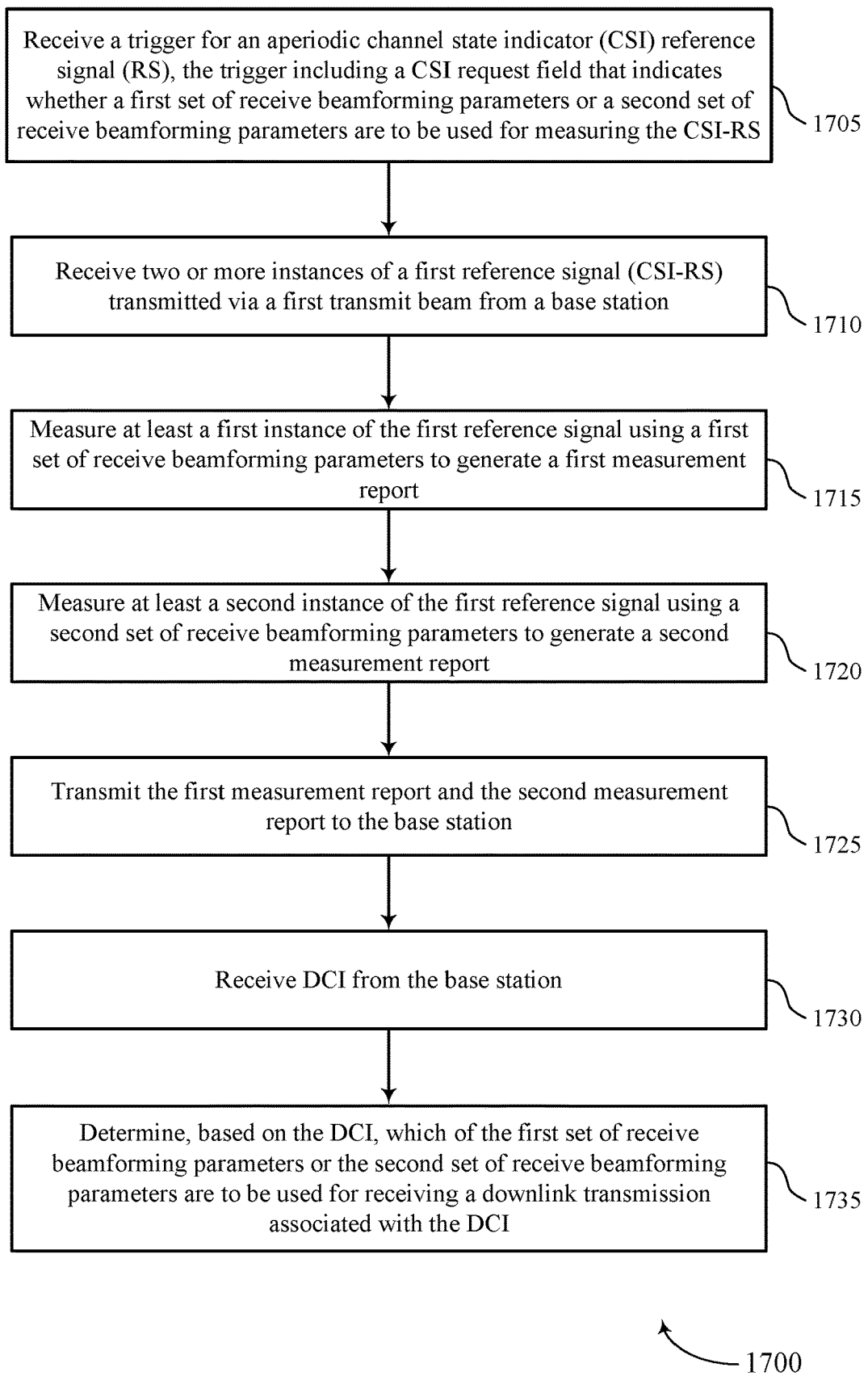

FIG. 17 shows a flowchart illustrating a method 1700 that supports multiple beams in wireless transmissions in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive a trigger for an aperiodic CSI-RS, the trigger including a CSI request field that indicates whether a first set of receive beamforming parameters or a second set of receive beamforming parameters are to be used for measuring the CSI-RS. The operations of 1705 may be performed according to the methods described herein. In some examples, aspects of the operations of 1705 may be performed by a DCI component as described with reference to FIGS. 7 through 10.

At 1710, the UE may receive two or more instances of a first reference signal (CSI-RS) transmitted via a first transmit beam from a base station. The operations of 1710 may be performed according to the methods described herein. In some examples, aspects of the operations of 1710 may be performed by a reference signal manager as described with reference to FIGS. 7 through 10.

At 1715, the UE may measure at least a first instance of the first reference signal using a first set of receive beamforming parameters to generate a first measurement report. The operations of 1715 may be performed according to the methods described herein. In some examples, aspects of the operations of 1715 may be performed by a measurement component as described with reference to FIGS. 7 through 10.

At 1720, the UE may measure at least a second instance of the first reference signal using a second set of receive beamforming parameters to generate a second measurement report. The operations of 1720 may be performed according to the methods described herein. In some examples, aspects of the operations of 1720 may be performed by a measurement component as described with reference to FIGS. 7 through 10.

At 1725, the UE may transmit the first measurement report and the second measurement report to the base station. The operations of 1725 may be performed according to the methods described herein. In some examples, aspects of the operations of 1725 may be performed by a measurement reporting component as described with reference to FIGS. 7 through 10.

At 1730, the UE may receive DCI from the base station. The operations of 1730 may be performed according to the methods described herein. In some examples, aspects of the operations of 1730 may be performed by a DCI component as described with reference to FIGS. 7 through 10.

At 1735, the UE may determine, based on the DCI, which of the first set of receive beamforming parameters or the second set of receive beamforming parameters are to be used for receiving a downlink transmission associated with the DCI. The operations of 1735 may be performed according to the methods described herein. In some examples, aspects of the operations of 1735 may be performed by a receive beam manager as described with reference to FIGS. 7 through 10.

Figure 18:
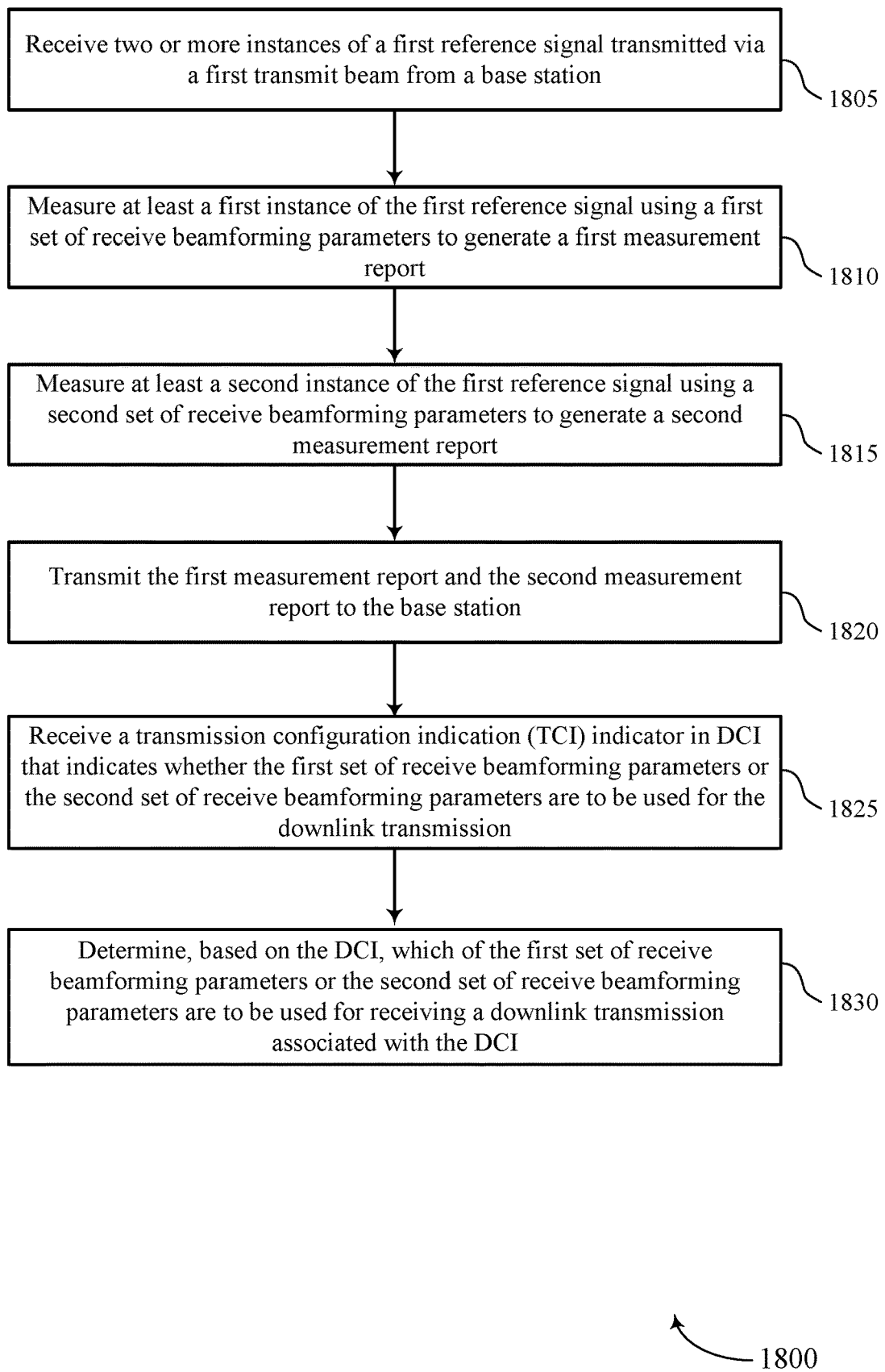

FIG. 18 shows a flowchart illustrating a method 1800 that supports multiple beams in wireless transmissions in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive two or more instances of a first reference signal transmitted via a first transmit beam from a base station. The operations of 1805 may be performed according to the methods described herein. In some examples, aspects of the operations of 1805 may be performed by a reference signal manager as described with reference to FIGS. 7 through 10.

At 1810, the UE may measure at least a first instance of the first reference signal using a first set of receive beamforming parameters to generate a first measurement report. The operations of 1810 may be performed according to the methods described herein. In some examples, aspects of the operations of 1810 may be performed by a measurement component as described with reference to FIGS. 7 through 10.

At 1815, the UE may measure at least a second instance of the first reference signal using a second set of receive beamforming parameters to generate a second measurement report. The operations of 1815 may be performed according to the methods described herein. In some examples, aspects of the operations of 1815 may be performed by a measurement component as described with reference to FIGS. 7 through 10.

At 1820, the UE may transmit the first measurement report and the second measurement report to the base station. The operations of 1820 may be performed according to the methods described herein. In some examples, aspects of the operations of 1820 may be performed by a measurement reporting component as described with reference to FIGS. 7 through 10.

At 1825, the UE may receive a transmission configuration indication (TCI) indicator in the DCI that indicates whether the first set of receive beamforming parameters or the second set of receive beamforming parameters are to be used for the downlink transmission. The operations of 1825 may be performed according to the methods described herein. In some examples, aspects of the operations of 1825 may be performed by a DCI component as described with reference to FIGS. 7 through 10.

At 1830, the UE may determine, based on the DCI, which of the first set of receive beamforming parameters or the second set of receive beamforming parameters are to be used for receiving a downlink transmission associated with the DCI. The operations of 1830 may be performed according to the methods described herein. In some examples, aspects of the operations of 1830 may be performed by a receive beam manager as described with reference to FIGS. 7 through 10.

Figure 19:
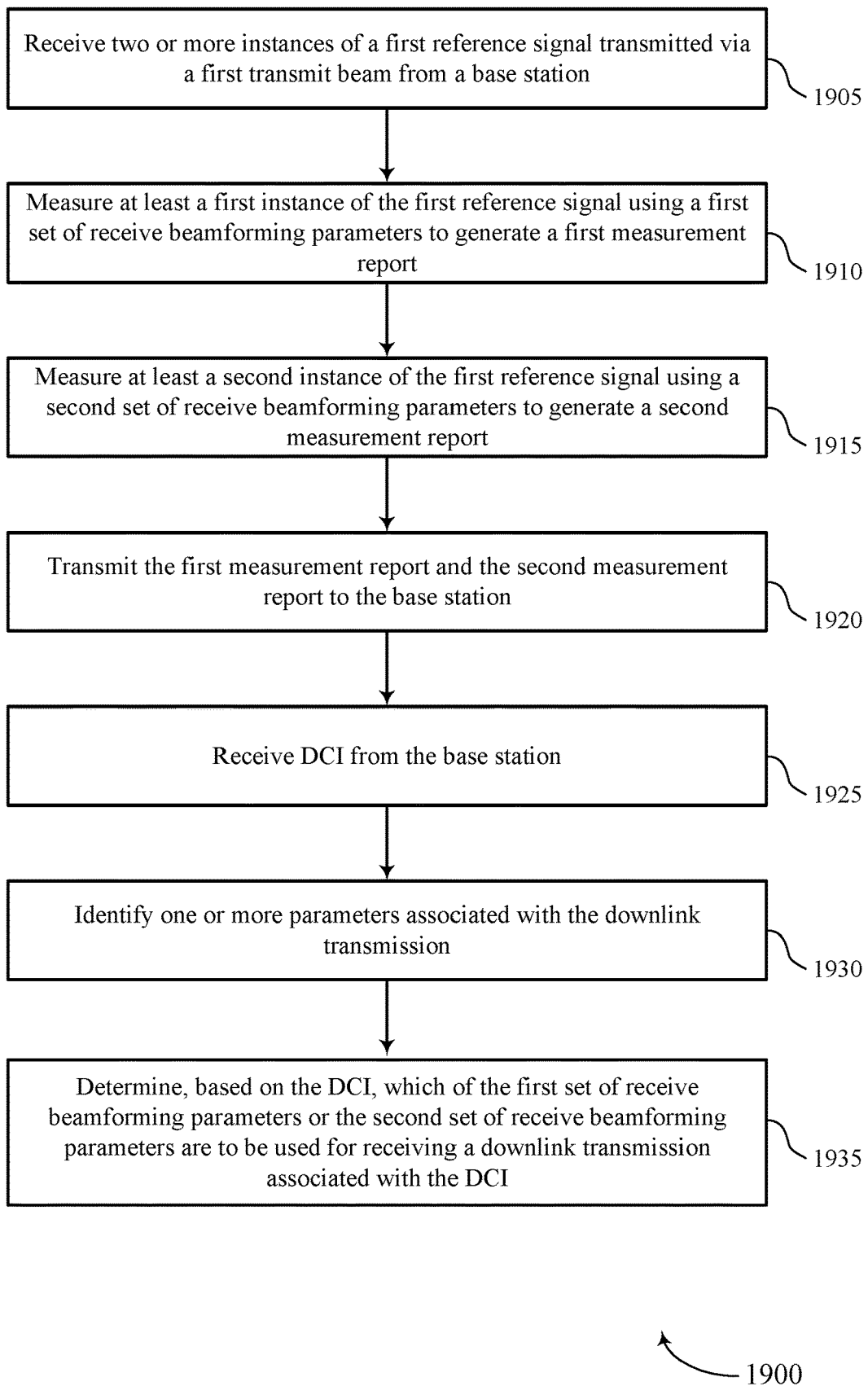

FIG. 19 shows a flowchart illustrating a method 1900 that supports multiple beams in wireless transmissions in accordance with aspects of the present disclosure. The operations of method 1900 may be implemented by a UE 115 or its components as described herein. For example, the operations of method 1900 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1905, the UE may receive two or more instances of a first reference signal transmitted via a first transmit beam from a base station. The operations of 1905 may be performed according to the methods described herein. In some examples, aspects of the operations of 1905 may be performed by a reference signal manager as described with reference to FIGS. 7 through 10.

At 1910, the UE may measure at least a first instance of the first reference signal using a first set of receive beamforming parameters to generate a first measurement report. The operations of 1910 may be performed according to the methods described herein. In some examples, aspects of the operations of 1910 may be performed by a measurement component as described with reference to FIGS. 7 through 10.

At 1915, the UE may measure at least a second instance of the first reference signal using a second set of receive beamforming parameters to generate a second measurement report. The operations of 1915 may be performed according to the methods described herein. In some examples, aspects of the operations of 1915 may be performed by a measurement component as described with reference to FIGS. 7 through 10.

At 1920, the UE may transmit the first measurement report and the second measurement report to the base station. The operations of 1920 may be performed according to the methods described herein. In some examples, aspects of the operations of 1920 may be performed by a measurement reporting component as described with reference to FIGS. 7 through 10.

At 1925, the UE may receive DCI from the base station. The operations of 1925 may be performed according to the methods described herein. In some examples, aspects of the operations of 1925 may be performed by a DCI component as described with reference to FIGS. 7 through 10.

At 1930, the UE may identify one or more parameters associated with the downlink transmission. The operations of 1930 may be performed according to the methods described herein. In some examples, aspects of the operations of 1930 may be performed by a receive beam manager as described with reference to FIGS. 7 through 10.

At 1935, the UE may determine, based on the DCI, which of the first set of receive beamforming parameters or the second set of receive beamforming parameters are to be used for receiving a downlink transmission associated with the DCI. The operations of 1935 may be performed according to the methods described herein. In some examples, aspects of the operations of 1935 may be performed by a receive beam manager as described with reference to FIGS. 7 through 10.

Figure 20:
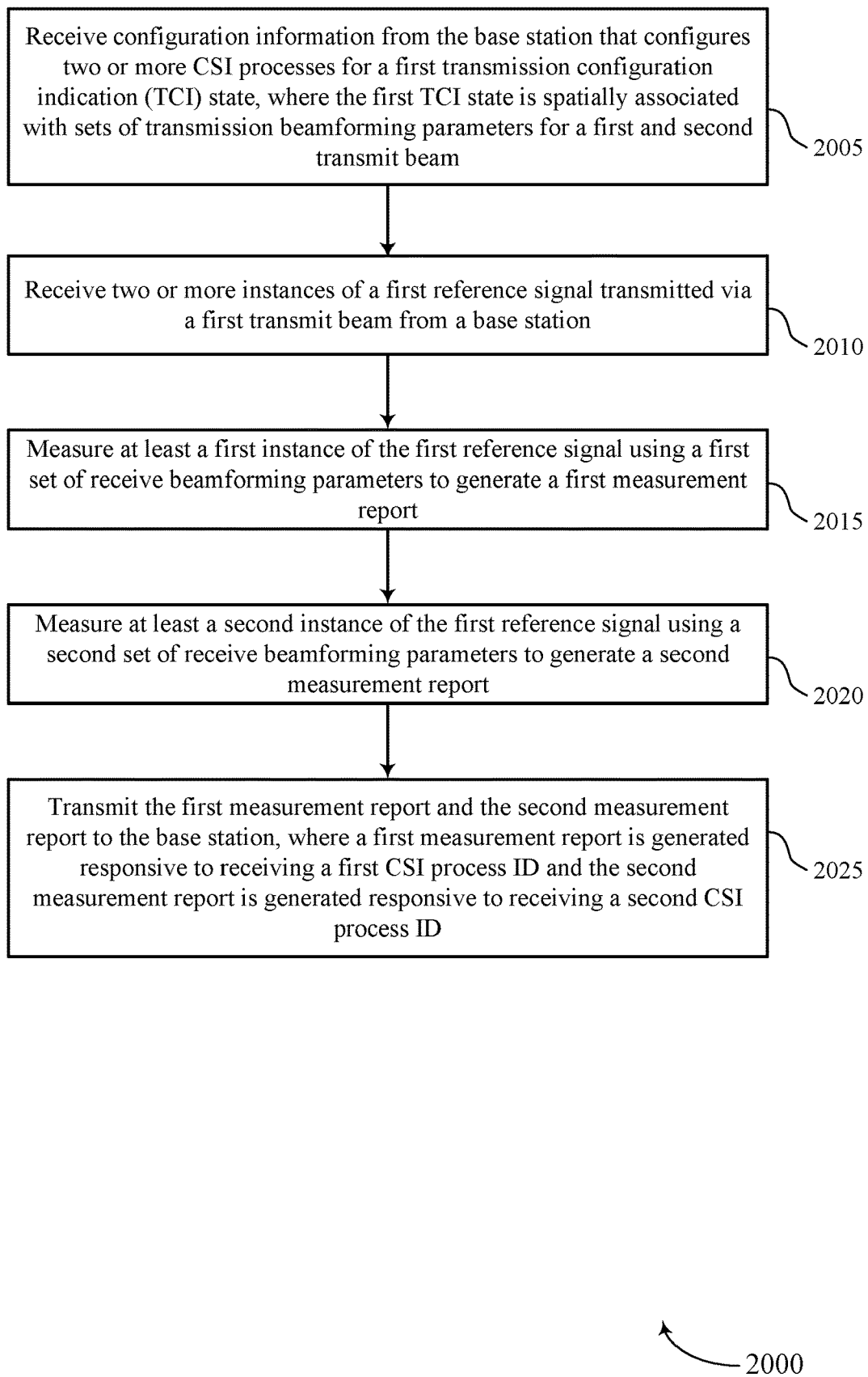

FIG. 20 shows a flowchart illustrating a method 2000 that supports multiple beams in wireless transmissions in accordance with aspects of the present disclosure. The operations of method 2000 may be implemented by a UE 115 or its components as described herein. For example, the operations of method 2000 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2005, the UE may receive configuration information from the base station that configures two or more CSI processes for a first TCI state, where the first TCI state is spatially associated with sets of transmission beamforming parameters for a first and second transmit beam. The operations of 2005 may be performed according to the methods described herein. In some examples, aspects of the operations of 2005 may be performed by a configuration manager as described with reference to FIGS. 7 through 10.

At 2010, the UE may receive two or more instances of a first reference signal transmitted via a first transmit beam from a base station. The operations of 2010 may be performed according to the methods described herein. In some examples, aspects of the operations of 2010 may be performed by a reference signal manager as described with reference to FIGS. 7 through 10.

At 2015, the UE may measure at least a first instance of the first reference signal using a first set of receive beamforming parameters to generate a first measurement report. The operations of 2015 may be performed according to the methods described herein. In some examples, aspects of the operations of 2015 may be performed by a measurement component as described with reference to FIGS. 7 through 10.

At 2020, the UE may measure at least a second instance of the first reference signal using a second set of receive beamforming parameters to generate a second measurement report. The operations of 2020 may be performed according to the methods described herein. In some examples, aspects of the operations of 2020 may be performed by a measurement component as described with reference to FIGS. 7 through 10.

At 2025, the UE may transmit the first measurement report and the second measurement report to the base station, where a first measurement report is generated responsive to receiving a first CSI process ID and the second measurement report is generated responsive to receiving a second CSI process ID. The operations of 2025 may be performed according to the methods described herein. In some examples, aspects of the operations of 2025 may be performed by a measurement reporting component as described with reference to FIGS. 7 through 10.

Figure 21:
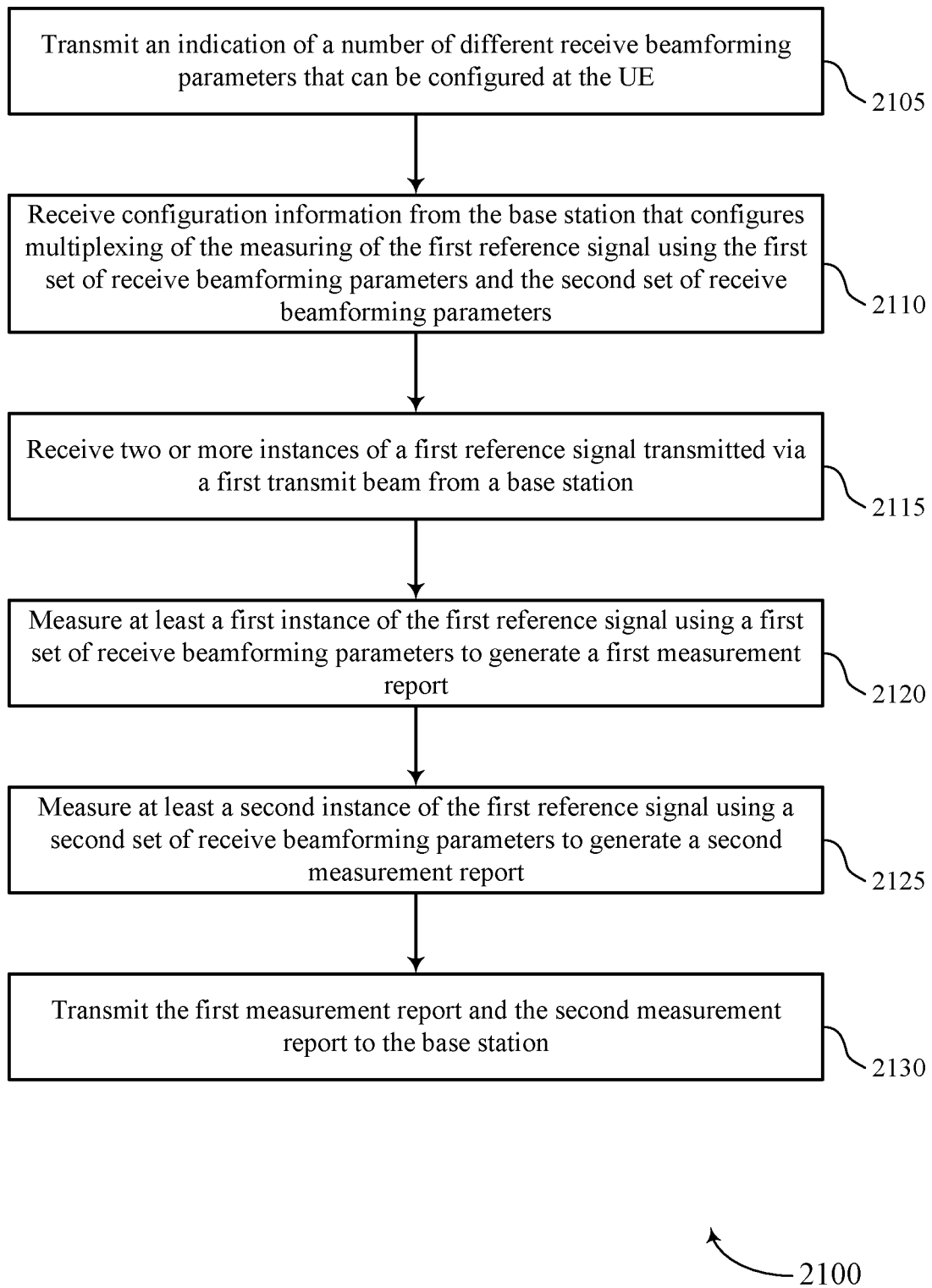

FIG. 21 shows a flowchart illustrating a method 2100 that supports multiple beams in wireless transmissions in accordance with aspects of the present disclosure. The operations of method 2100 may be implemented by a UE 115 or its components as described herein. For example, the operations of method 2100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2105, the UE may transmit an indication of a number of different receive beamforming parameters that can be configured at the UE. The operations of 2105 may be performed according to the methods described herein. In some examples, aspects of the operations of 2105 may be performed by a capability indication component as described with reference to FIGS. 7 through 10.

At 2110, the UE may receive configuration information from the base station that configures multiplexing of the measuring of the first reference signal using the first set of receive beamforming parameters and the second set of receive beamforming parameters. The operations of 2110 may be performed according to the methods described herein. In some examples, aspects of the operations of 2110 may be performed by a configuration manager as described with reference to FIGS. 7 through 10.

At 2115, the UE may receive two or more instances of a first reference signal transmitted via a first transmit beam from a base station. The operations of 2115 may be performed according to the methods described herein. In some examples, aspects of the operations of 2115 may be performed by a reference signal manager as described with reference to FIGS. 7 through 10.

At 2120, the UE may measure at least a first instance of the first reference signal using a first set of receive beamforming parameters to generate a first measurement report. The operations of 2120 may be performed according to the methods described herein. In some examples, aspects of the operations of 2120 may be performed by a measurement component as described with reference to FIGS. 7 through 10.

At 2125, the UE may measure at least a second instance of the first reference signal using a second set of receive beamforming parameters to generate a second measurement report. The operations of 2125 may be performed according to the methods described herein. In some examples, aspects of the operations of 2125 may be performed by a measurement component as described with reference to FIGS. 7 through 10.

At 2130, the UE may transmit the first measurement report and the second measurement report to the base station. The operations of 2130 may be performed according to the methods described herein. In some examples, aspects of the operations of 2130 may be performed by a measurement reporting component as described with reference to FIGS. 7 through 10.

Figure 22:
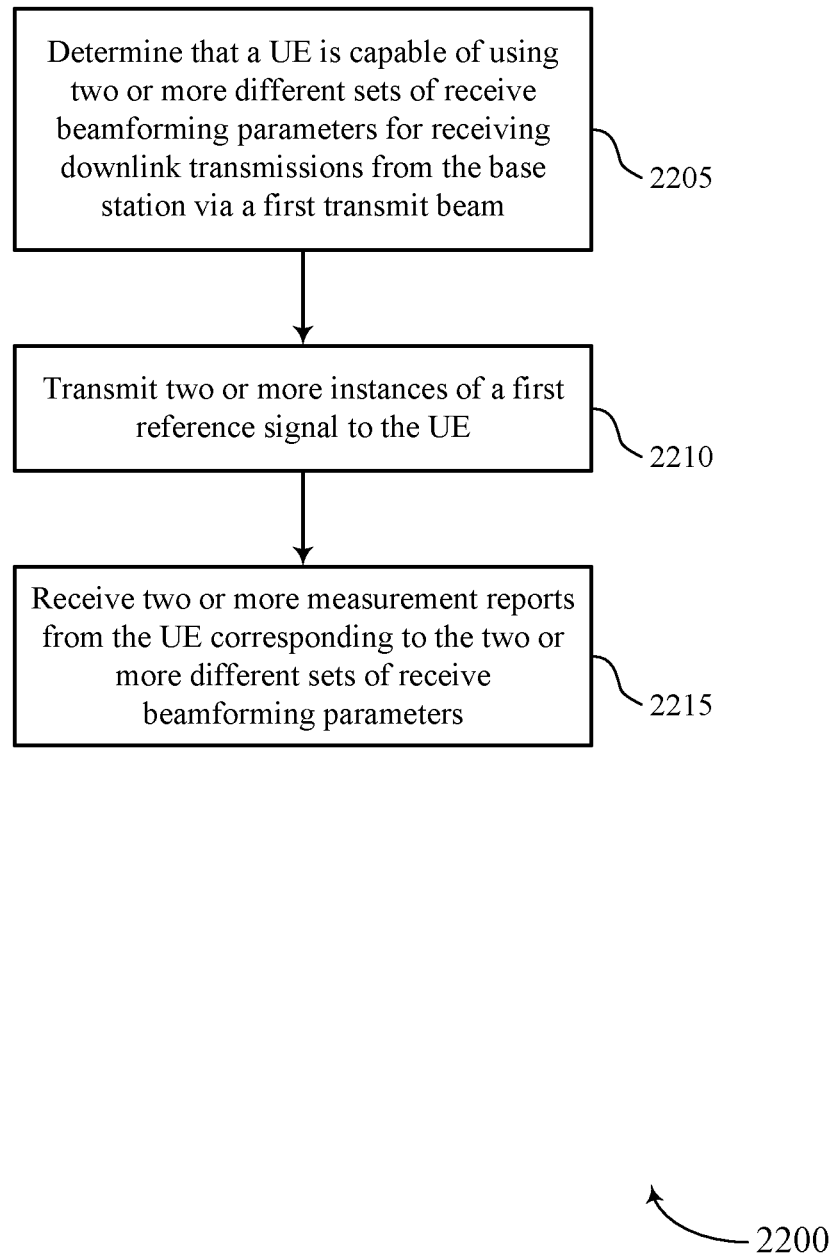

FIG. 22 shows a flowchart illustrating a method 2200 that supports multiple beams in wireless transmissions in accordance with aspects of the present disclosure. The operations of method 2200 may be implemented by a base station 105 or its components as described herein. For example, the operations of method 2200 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2205, the base station may determine that a UE is capable of using two or more different sets of receive beamforming parameters for receiving downlink transmissions from the base station via a first transmit beam. The operations of 2205 may be performed according to the methods described herein. In some examples, aspects of the operations of 2205 may be performed by a configuration manager as described with reference to FIGS. 11 through 14.

At 2210, the base station may transmit two or more instances of a first reference signal to the UE. The operations of 2210 may be performed according to the methods described herein. In some examples, aspects of the operations of 2210 may be performed by a reference signal manager as described with reference to FIGS. 11 through 14.

At 2215, the base station may receive two or more measurement reports from the UE corresponding to the two or more different sets of receive beamforming parameters. The operations of 2215 may be performed according to the methods described herein. In some examples, aspects of the operations of 2215 may be performed by a measurement report component as described with reference to FIGS. 11 through 14.

Figure 23:
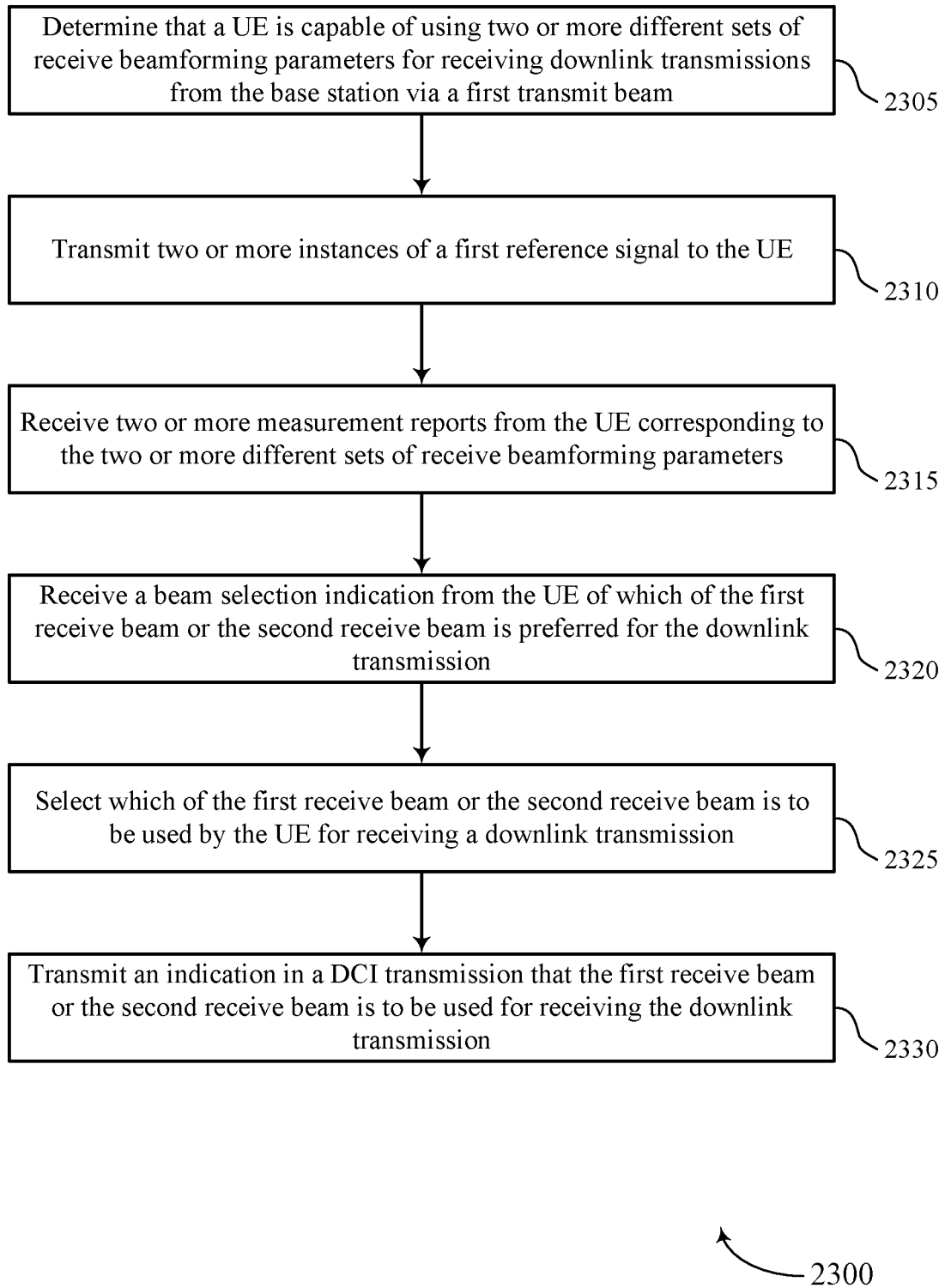

FIG. 23 shows a flowchart illustrating a method 2300 that supports multiple beams in wireless transmissions in accordance with aspects of the present disclosure. The operations of method 2300 may be implemented by a base station 105 or its components as described herein. For example, the operations of method 2300 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2305, the base station may determine that a UE is capable of using two or more different sets of receive beamforming parameters for receiving downlink transmissions from the base station via a first transmit beam. The operations of 2305 may be performed according to the methods described herein. In some examples, aspects of the operations of 2305 may be performed by a configuration manager as described with reference to FIGS. 11 through 14.

At 2310, the base station may transmit two or more instances of a first reference signal to the UE. The operations of 2310 may be performed according to the methods described herein. In some examples, aspects of the operations of 2310 may be performed by a reference signal manager as described with reference to FIGS. 11 through 14.

At 2315, the base station may receive two or more measurement reports from the UE corresponding to the two or more different sets of receive beamforming parameters. The operations of 2315 may be performed according to the methods described herein. In some examples, aspects of the operations of 2315 may be performed by a measurement report component as described with reference to FIGS. 11 through 14.

At 2320, the base station may receive a beam selection indication from the UE of which of the first receive beam or the second receive beam is preferred for the downlink transmission. The operations of 2320 may be performed according to the methods described herein. In some examples, aspects of the operations of 2320 may be performed by a receive beam manager as described with reference to FIGS. 11 through 14.

At 2325, the base station may select which of the first receive beam or the second receive beam is to be used by the UE for receiving a downlink transmission. The operations of 2325 may be performed according to the methods described herein. In some examples, aspects of the operations of 2325 may be performed by a receive beam manager as described with reference to FIGS. 11 through 14.

At 2330, the base station may transmit an indication in a DCI transmission that the first receive beam or the second receive beam is to be used for receiving the downlink transmission. The operations of 2330 may be performed according to the methods described herein. In some examples, aspects of the operations of 2330 may be performed by a DCI component as described with reference to FIGS. 11 through 14.

Figure 24:
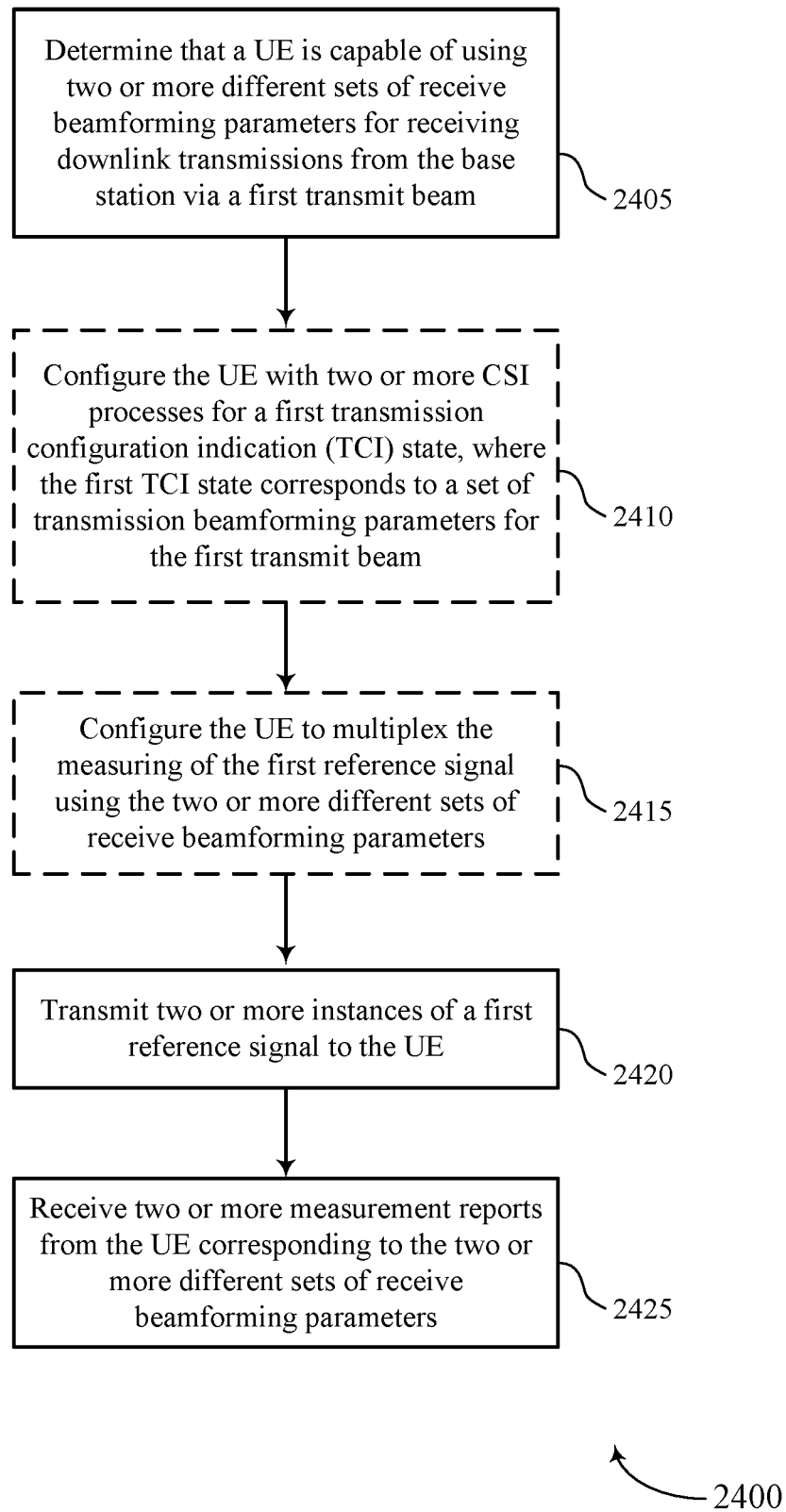

FIG. 24 shows a flowchart illustrating a method 2400 that supports multiple beams in wireless transmissions in accordance with aspects of the present disclosure. The operations of method 2400 may be implemented by a base station 105 or its components as described herein. For example, the operations of method 2400 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2405, the base station may determine that a UE is capable of using two or more different sets of receive beamforming parameters for receiving downlink transmissions from the base station via a first transmit beam. The operations of 2405 may be performed according to the methods described herein. In some examples, aspects of the operations of 2405 may be performed by a configuration manager as described with reference to FIGS. 11 through 14.

At 2410, the base station optionally may configure the UE with two or more CSI processes for a first TCI state, where the first TCI state corresponds to a set of transmission beamforming parameters for the first transmit beam. The operations of 2410 may be performed according to the methods described herein. In some examples, aspects of the operations of 2410 may be performed by a reference signal manager as described with reference to FIGS. 11 through 14.

At 2415, the base station optionally may configure the UE to multiplex the measuring of the first reference signal using the two or more different sets of receive beamforming parameters. The operations of 2415 may be performed according to the methods described herein. In some examples, aspects of the operations of 2415 may be performed by a reference signal manager as described with reference to FIGS. 11 through 14.

At 2420, the base station may transmit two or more instances of a first reference signal to the UE. The operations of 2420 may be performed according to the methods described herein. In some examples, aspects of the operations of 2420 may be performed by a reference signal manager as described with reference to FIGS. 11 through 14.

At 2425, the base station may receive two or more measurement reports from the UE corresponding to the two or more different sets of receive beamforming parameters. The operations of 2425 may be performed according to the methods described herein. In some examples, aspects of the operations of 2425 may be performed by a measurement report component as described with reference to FIGS. 11 through 14.

Figure 25:
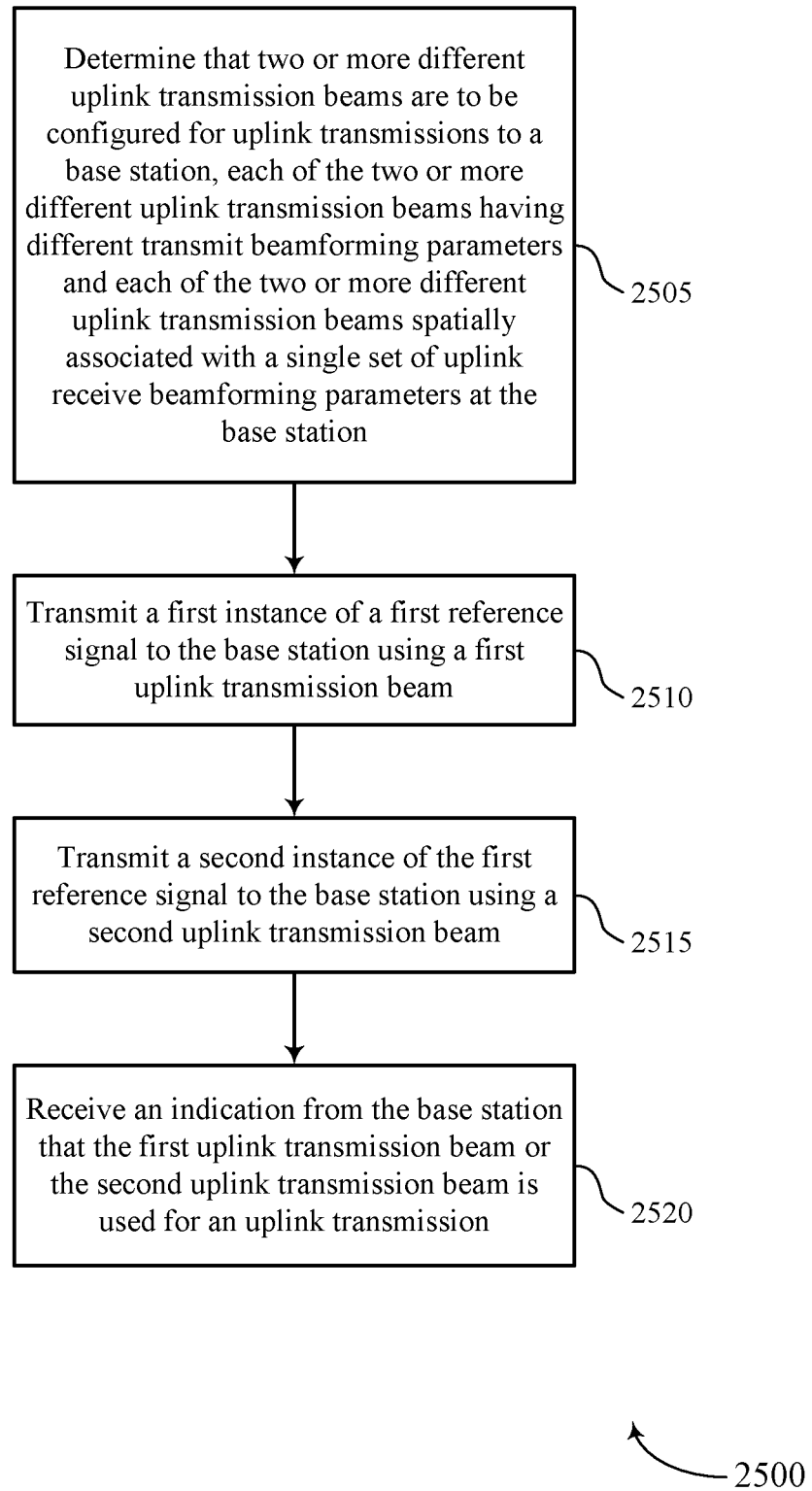

FIG. 25 shows a flowchart illustrating a method 2500 that supports multiple beams in wireless transmissions in accordance with aspects of the present disclosure. The operations of method 2500 may be implemented by a UE 115 or its components as described herein. For example, the operations of method 2500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2505, the UE may determine that two or more different uplink transmission beams are to be configured for uplink transmissions to a base station, each of the two or more different uplink transmission beams having different transmit beamforming parameters and each of the two or more different uplink transmission beams spatially associated with a single set of uplink receive beamforming parameters at the base station. The operations of 2505 may be performed according to the methods described herein. In some examples, aspects of the operations of 2505 may be performed by an uplink transmission beam manager as described with reference to FIGS. 7 through 10.

At 2510, the UE may transmit a first instance of a first reference signal to the base station using a first uplink transmission beam. The operations of 2510 may be performed according to the methods described herein. In some examples, aspects of the operations of 2510 may be performed by a reference signal manager as described with reference to FIGS. 7 through 10.

At 2515, the UE may transmit a second instance of the first reference signal to the base station using a second uplink transmission beam. The operations of 2515 may be performed according to the methods described herein. In some examples, aspects of the operations of 2515 may be performed by a reference signal manager as described with reference to FIGS. 7 through 10.

At 2520, the UE may receive an indication from the base station that the first uplink transmission beam or the second uplink transmission beam is used for an uplink transmission. The operations of 2520 may be performed according to the methods described herein. In some examples, aspects of the operations of 2520 may be performed by an uplink transmission beam manager as described with reference to FIGS. 7 through 10.

Figure 26:
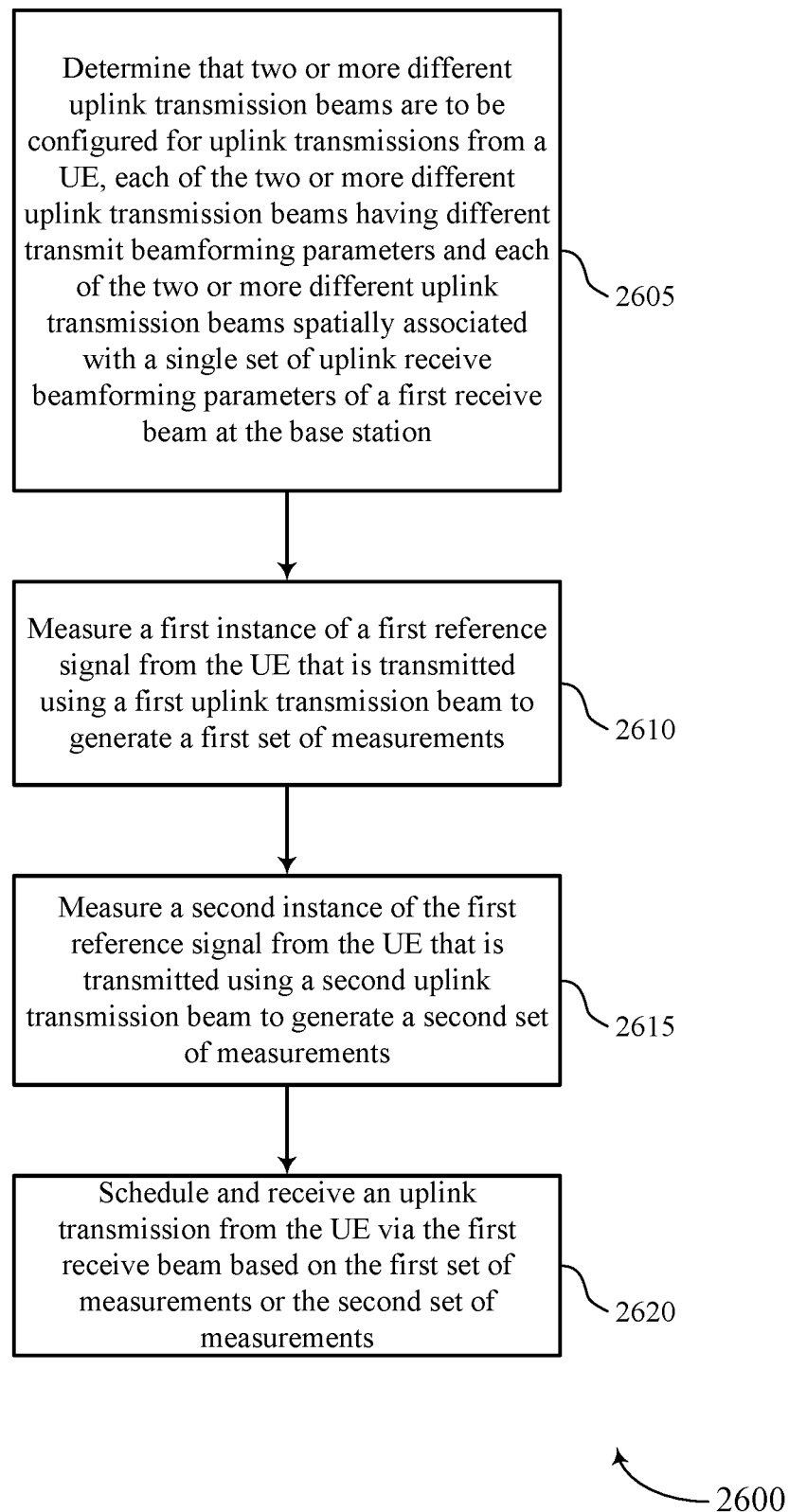

FIG. 26 shows a flowchart illustrating a method 2600 that supports multiple beams in wireless transmissions in accordance with aspects of the present disclosure. The operations of method 2600 may be implemented by a base station 105 or its components as described herein. For example, the operations of method 2600 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2605, the base station may determine that two or more different uplink transmission beams are to be configured for uplink transmissions from a UE, each of the two or more different uplink transmission beams having different transmit beamforming parameters and each of the two or more different uplink transmission beams spatially associated with a single set of uplink receive beamforming parameters of a first receive beam at the base station. The operations of 2605 may be performed according to the methods described herein. In some examples, aspects of the operations of 2605 may be performed by a configuration manager as described with reference to FIGS. 11 through 14.

At 2610, the base station may measure a first instance of a first reference signal from the UE that is transmitted using a first uplink transmission beam to generate a first set of measurements. The operations of 2610 may be performed according to the methods described herein. In some examples, aspects of the operations of 2610 may be performed by a reference signal manager as described with reference to FIGS. 11 through 14.

At 2615, the base station may measure a second instance of the first reference signal from the UE that is transmitted using a second uplink transmission beam to generate a second set of measurements. The operations of 2615 may be performed according to the methods described herein. In some examples, aspects of the operations of 2615 may be performed by a reference signal manager as described with reference to FIGS. 11 through 14.

At 2620, the base station may schedule and receive an uplink transmission from the UE via the first receive beam based on the first set of measurements or the second set of measurements. The operations of 2620 may be performed according to the methods described herein. In some examples, aspects of the operations of 2620 may be performed by an uplink receive beam manager as described with reference to FIGS. 11 through 14.

Embodiment 1

A method for wireless communication at a UE or like wireless device, comprising: receiving two or more instances of a first reference signal transmitted via a first transmit beam from a base station; measuring at least a first instance of the first reference signal using a first set of receive beamforming parameters to generate a first measurement report; measuring at least a second instance of the first reference signal using a second set of receive beamforming parameters to generate a second measurement report; and transmitting the first measurement report and the second measurement report to the base station.

Embodiment 2

The method of embodiment 1, further comprising: receiving DCI from the base station; and determining, based at least in part on the DCI, which of the first set of receive beamforming parameters or the second set of receive beamforming parameters are to be used for receiving a downlink transmission associated with the DCI.

Embodiment 3

The method of embodiment 2, further comprising: transmitting, prior to receiving the two or more instances of the first reference signal, an indication of which of the first set of receive beamforming parameters or the second set of receive beamforming parameters is preferred for the downlink transmission.

Embodiment 4

The method of any of embodiments 2 to 3, wherein the receiving the DCI further comprises: receiving a trigger for an aperiodic CSI-RS, the trigger including a CSI request field that indicates whether the first set of receive beamforming parameters or the second set of receive beamforming parameters are to be used for measuring the CSI-RS.

Embodiment 5

The method of any of embodiments 2 to 4, wherein the determining comprises: identifying one or more parameters associated with the downlink transmission; and determining whether the first set of receive beamforming parameters or the second set of receive beamforming parameters are to be used for the downlink transmission based at least in part on the one or more parameters associated with the downlink transmissions.

Embodiment 6

The method of embodiment 5, wherein the one or more parameters associated with the downlink transmission comprise one or more of a signaled RI, a signaled MCS, or a signaled PMI, and wherein the determining further comprises: identifying a first RI, PMI and a first MCS associated with the first measurement report and a second RI and second MCS associated with the second measurement report; determining that the first set of receive beamforming parameters are to be used for the downlink transmission based at least in part on the signaled RI and signaled MCS matching the first RI and the first MCS or a distance metric corresponding to different RI and MCS values; and determining that the second set of receive beamforming parameters are to be used for the downlink transmission based at least in part on the signaled RI and signaled MCS matching the second RI and the second MCS or the distance metric.

Embodiment 7

The method of any of embodiments 1 to 6, wherein each of the first measurement report and the second measurement report comprise one or more of a CQI based on the associated receive beamforming parameters, a PMI based on the associated receive beamforming parameters, an RI based on associated receive beamforming parameters, or combinations thereof.

Embodiment 8

The method of any of embodiments 1 to 7, wherein the first set of receive beamforming parameters and the second set of receive beamforming parameters each comprise one or more of: an RF path; antenna phase parameters for a receive beam pattern; antenna RF frontend gains; a baseband clock mode; or combinations thereof.

Embodiment 9

The method of any of embodiments 1 to 8, further comprising: receiving configuration information from the base station that configures two or more CSI processes for a first TCI state, wherein the first TCI state corresponds to a set of transmission beamforming parameters for the first transmit beam; and wherein the first measurement report is generated responsive to receiving a first CSI process ID and the second measurement report is generated responsive to receiving a second CSI process ID.

Embodiment 10

The method of embodiment 9, wherein the first CSI process ID is received via RRC signaling associated with the first instance of the first reference signal and the second CSI process ID is received via RRC signaling associated with the second instance of the first reference signal.

Embodiment 11

The method of any of embodiments 1 to 10, further comprising: receiving configuration information from the base station that configures a multiplexing pattern of the measuring of the first reference signal using the first set of receive beamforming parameters and the second set of receive beamforming parameters.

Embodiment 12

The method of embodiment 11, further comprising: transmitting, prior to receiving the configuration information, an indication of a number of different receive beamforming parameters that can be configured at the UE.

Embodiment 13

A method for wireless communication at a base station or like wireless device, comprising: determining that a UE is capable of using two or more different sets of receive beamforming parameters for receiving downlink transmissions from the base station via a first transmit beam; transmitting two or more instances of a first reference signal to the UE; and receiving two or more measurement reports from the UE corresponding to the two or more different sets of receive beamforming parameters.

Embodiment 14

The method of embodiment 13, wherein the two or more measurement reports include a first measurement report for a first receive beam at the UE and a second measurement report for a second receive beam at the UE, and wherein the method further comprises: selecting which of the first receive beam or the second receive beam is to be used by the UE for receiving a downlink transmission; and transmitting an indication in a DCI transmission that the first receive beam or the second receive beam is to be used for receiving the downlink transmission.

Embodiment 15

The method of embodiment 14, further comprising: receiving, prior to the selecting, a beam selection indication from the UE of which of the first receive beam or the second receive beam is preferred for the downlink transmission.

Embodiment 16

The method of any of embodiments 14 to 15, wherein the DCI includes a trigger for an aperiodic CSI-RS, the trigger including a CSI request field that indicates which of the two or more different sets of receive beamforming parameters are to be used for measuring the CSI-RS at the UE.

Embodiment 17

The method of any of embodiments 13 to 16, wherein each of the two or more measurement reports include one or more of a CQI, a PMI, an RI, or combinations thereof, that are determined based on the two or more different sets of receive beamforming parameters.

Embodiment 18

The method of any of embodiments 13 to 17, further comprising: configuring the UE with two or more CSI processes for a first TCI state, wherein the first TCI state corresponds to a set of transmission beamforming parameters for the first transmit beam.

Embodiment 19

The method of any of embodiments 13 to 18, further comprising: configuring the UE to multiplex the measuring of the first reference signal using the two or more different sets of receive beamforming parameters.

Embodiment 20

The method of embodiment 19, further comprising: receiving, prior to the configuring, an indication of a number of different receive beams that can be configured at the UE.

Embodiment 21

A method for wireless communication at a UE or like wireless device, comprising: determining that two or more different uplink transmission beams are to be configured for uplink transmissions to a base station, each of the two or more different uplink transmission beams having different transmit beamforming parameters and each of the two or more different uplink transmission beams spatially associated with a single set of uplink receive beamforming parameters at the base station; transmitting a first instance of a first reference signal to the base station using a first uplink transmission beam; transmitting a second instance of the first reference signal to the base station using a second uplink transmission beam; and receiving an indication from the base station that the first uplink transmission beam or the second uplink transmission beam is used for an uplink transmission.

Embodiment 22

The method of embodiment 21, further comprising: receiving configuration information from the base station that configures two or more SRS resources for two or more instances of a SRS transmission using each of the two or more uplink transmission beams.

Embodiment 23

The method of embodiment 22, wherein the two or more SRS resources comprise aperiodic, periodic, or semi-persistent SRS resources, and the two or more uplink transmission beams are multiplexed across the two or more SRS resources.

Embodiment 24

The method of embodiment 23, wherein the configuration information configures a multiplexing pattern of the two or more uplink transmission beams across the two or more SRS resources.

Embodiment 25

The method of any of embodiments 21 to 24, further comprising: transmitting, prior to the determining, an indication of a number of different transmission beams that can be configured at the UE.

Embodiment 26

A method for wireless communication at a base station or like wireless device, comprising: determining that two or more different uplink transmission beams are to be configured for uplink transmissions from a UE, each of the two or more different uplink transmission beams having different transmit beamforming parameters and each of the two or more different uplink transmission beams spatially associated with a single set of uplink receive beamforming parameters of a first receive beam at the base station; measuring a first instance of a first reference signal from the UE that is transmitted using a first uplink transmission beam to generate a first set of measurements; measuring a second instance of the first reference signal from the UE that is transmitted using a second uplink transmission beam to generate a second set of measurements; and scheduling and receiving an uplink transmission from the UE via the first receive beam based at least in part on the first set of measurements or the second set of measurements.

Embodiment 27

The method of embodiment 26, further comprising: transmitting configuration information to the UE that configures two or more SRS resources for two or more instances of a SRS transmission using each of the two or more uplink transmission beams.

Embodiment 28

The method of embodiment 27, wherein the two or more SRS resources comprise aperiodic, periodic, or semi-persistent SRS resources, and the two or more uplink transmission beams are multiplexed across the two or more SRS resources.

Embodiment 29

The method of embodiment 28, wherein the configuration information configures a multiplexing pattern of the two or more uplink transmission beams across the two or more SRS resources.

Embodiment 30

The method of any of embodiments 26 to 29, further comprising: receiving, prior to the determining, an indication of a number of different transmission beams that can be configured at the UE.

Embodiment 31

An apparatus comprising at least one means for performing a method of any of embodiments 1 to 12.

Embodiment 32

An apparatus comprising at least one means for performing a method of any of embodiments 13 to 20.

Embodiment 33

An apparatus comprising at least one means for performing a method of any of embodiments 21 to 25.

Embodiment 34

An apparatus comprising at least one means for performing a method of any of embodiments 26 to 30.

Embodiment 35

An apparatus for wireless communication, comprising: a processor; memory in communication with the processor; and instructions stored in the memory and executable by the processor to cause the apparatus to perform a method of any of embodiments 1 to 12.

Embodiment 36

An apparatus for wireless communication, comprising: a processor; memory in communication with the processor; and instructions stored in the memory and executable by the processor to cause the apparatus to perform a method of any of embodiments 13 to 20.

Embodiment 37

An apparatus for wireless communication, comprising: a processor; memory in communication with the processor; and instructions stored in the memory and executable by the processor to cause the apparatus to perform a method of any of embodiments 21 to 25.

Embodiment 38

An apparatus for wireless communication, comprising: a processor; memory in communication with the processor; and instructions stored in the memory and executable by the processor to cause the apparatus to perform a method of any of embodiments 26 to 30.

Embodiment 39

A non-transitory computer-readable medium storing code for wireless communications, the code comprising instructions executable by a processor to perform a method of any of embodiments 1 to 12.

Embodiment 40

A non-transitory computer-readable medium storing code for wireless communications, the code comprising instructions executable by a processor to perform a method of any of embodiments 13 to 20.

Embodiment 41

A non-transitory computer-readable medium storing code for wireless communications, the code comprising instructions executable by a processor to perform a method of any of embodiments 21 to 25.

Embodiment 42

A non-transitory computer-readable medium storing code for wireless communications, the code comprising instructions executable by a processor to perform a method of any of embodiments 26 to 30.

It should be noted that the methods and embodiments described above describe possible implementations, and that the operations and the steps may be rearranged or otherwise modified and that other implementations are possible. Further, aspects from two or more of the methods and embodiments may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving two or more instances of a first reference signal transmitted via a first transmit beam from a base station;
    measuring at least a first instance of the first reference signal using a first set of receive beamforming parameters to generate a first measurement report, the first measurement report including one or more of a rank indicator (RI), precoding matrix indicator (PMI), or modulation and coding scheme (MCS) associated with the first set of receive beamforming parameters;
    measuring at least a second instance of the first reference signal using a second set of receive beamforming parameters to generate a second measurement report, the second measurement report including one or more of a RI, PMI, or MCS associated with the second set of receive beamforming parameters;
    transmitting the first measurement report and the second measurement report to the base station
    receiving downlink control information (DCI) from the base station, the DCI including one or more of a signaled RI, PMI, or MCS associated with a downlink transmission;
    comparing one or more of the signaled RI, PMI, or MCS in the DCI to one or more of the RI, PMI, or MCS in the first and second measurement reports;
    selecting the first or second receive beamforming parameters based on the comparison; and
    receiving the downlink transmission using the selected receive beamforming parameters.

2. The method of claim 1, further comprising:
    transmitting, prior to receiving the two or more instances of the first reference signal, an indication of which of the first set of receive beamforming parameters or the second set of receive beamforming parameters is preferred for the downlink transmission.

3. The method of claim 1, wherein the receiving the DCI further comprises:
    receiving a trigger for an aperiodic channel state indicator (CSI) reference signal (RS), the trigger including a CSI request field that indicates whether the first set of receive beamforming parameters or the second set of receive beamforming parameters are to be used for measuring the CSI-RS.

4. The method of claim 1, wherein each of the first measurement report and the second measurement report comprise one or more of a channel quality indicator (CQI) based on the associated receive beamforming parameters.

5. The method of claim 1, wherein the first set of receive beamforming parameters and the second set of receive beamforming parameters each comprise one or more of:
    a radio frequency (RF) path;
    antenna phase parameters for a receive beam pattern;
    antenna RF frontend gains;
    a baseband clock mode;
    or combinations thereof.

6. The method of claim 1, further comprising:
    receiving configuration information from the base station that configures two or more channel state information (CSI) processes for a first transmission configuration indication (TCI) state, wherein the first TCI state corresponds to a set of transmission beamforming parameters for the first transmit beam; and wherein the first measurement report is generated responsive to receiving a first CSI process ID and the second measurement report is generated responsive to receiving a second CSI process ID.

7. The method of claim 6, wherein the first CSI process ID is received via radio resource control (RRC) signaling associated with the first instance of the first reference signal and the second CSI process ID is received via RRC signaling associated with the second instance of the first reference signal.

8. The method of claim 1, further comprising:
receiving configuration information from the base station that configures a multiplexing pattern of the measuring of the first reference signal using the first set of receive beamforming parameters and the second set of receive beamforming parameters.

9. The method of claim 8, further comprising:
transmitting, prior to receiving the configuration information, an indication of a number of different receive beamforming parameters that can be configured at the UE.

10. A method for wireless communication at a base station, comprising:
determining that a user equipment (UE) is capable of using two or more different sets of receive beamforming parameters for receiving downlink transmissions from the base station via a first transmit beam;
transmitting two or more instances of a first reference signal to the UE via a first transmit beam; and
receiving a first measurement report from the UE including one or more of a RI, PMI, or MCS associated with a first set of receive beamforming parameters;
receiving a second measurement report from the UE including one or more of a RI, PMI, or MCS associated with a second set of receive beamforming parameters;
selecting which of the first receive beam or the second receive beam is to be used by the UE for receiving a downlink transmission; and
transmitting an indication in a downlink control information (DCI) transmission that the first receive beam or the second receive beam is to be used for receiving the downlink transmission, wherein the indication comprises an RI, PMI, or MCS received in the first or second measurement report and associated with the selected first or second receive beam.

11. The method of claim 10, further comprising:
receiving, prior to the selecting, a beam selection indication from the UE of which of the first receive beam or the second receive beam is preferred for the downlink transmission.

12. The method of claim 10, wherein the DCI includes a trigger for an aperiodic channel state indicator (CSI) reference signal (RS), the trigger including a CSI request field that indicates which of the two or more different sets of receive beamforming parameters are to be used for measuring the CSI-RS at the UE.

13. The method of claim 10, wherein each of the two or more measurement reports include one or more of a channel quality indicator (CQI.

14. The method of claim 10, further comprising:
configuring the UE with two or more channel state information (CSI) processes for a first transmission configuration indication (TCI) state, wherein the first TCI state corresponds to a set of transmission beamforming parameters for the first transmit beam.

15. The method of claim 10, further comprising:
configuring the UE to multiplex the measuring of the first reference signal using the two or more different sets of receive beamforming parameters.

16. The method of claim 15, further comprising:
receiving, prior to the configuring, an indication of a number of different receive beams that can be configured at the UE.

* * * * *